(12) United States Patent
Ikegawa et al.

(10) Patent No.: US 11,049,516 B1
(45) Date of Patent: Jun. 29, 2021

(54) NEAR-FIELD LIGHT GENERATOR AND THERMALLY-ASSISTED MAGNETIC RECORDING HEAD

(71) Applicants: Yukinori Ikegawa, Milpitas, CA (US);
Yoshitaka Sasaki, Los Gatos, CA (US);
Hiroyuki Ito, Milpitas, CA (US);
Shigeki Tanemura, Milpitas, CA (US);
Yoji Nomura, Milpitas, CA (US)

(72) Inventors: Yukinori Ikegawa, Milpitas, CA (US);
Yoshitaka Sasaki, Los Gatos, CA (US);
Hiroyuki Ito, Milpitas, CA (US);
Shigeki Tanemura, Milpitas, CA (US);
Yoji Nomura, Milpitas, CA (US)

(73) Assignee: HEADWAY TECHNOLOGIES, INC., Milpitas, CA (US)

( * ) Notice: Subject to any disclaimer, the term of this patent is extended or adjusted under 35 U.S.C. 154(b) by 0 days.

(21) Appl. No.: 17/069,527

(22) Filed: Oct. 13, 2020

(51) Int. Cl.
*G11B 5/39* (2006.01)
*G11B 5/48* (2006.01)
*G11B 5/187* (2006.01)
*G11B 5/00* (2006.01)

(52) U.S. Cl.
CPC .......... *G11B 5/3909* (2013.01); *G11B 5/1875* (2013.01); *G11B 5/4866* (2013.01); *G11B 2005/0021* (2013.01); *G11B 2005/3996* (2013.01)

(58) Field of Classification Search
CPC ... G11B 5/3909; G11B 5/1875; G11B 5/4866; G11B 2005/0021; G11B 2005/3996

USPC .............................. 369/13.11–13.18
See application file for complete search history.

(56) References Cited

U.S. PATENT DOCUMENTS

| | | | |
|---|---|---|---|
| 8,270,791 B2 * | 9/2012 | Komura ................. | G11B 5/314 385/37 |
| 8,711,663 B1 | 4/2014 | Sasaki et al. | |
| 8,861,138 B2 | 10/2014 | Sasaki et al. | |
| 8,867,170 B1 * | 10/2014 | Sasaki .................. | G11B 5/6088 360/125.3 |
| 9,460,740 B1 * | 10/2016 | Staffaroni ............ | G02B 6/1228 |
| 9,754,614 B1 | 9/2017 | Sasaki et al. | |
| 10,410,664 B1 * | 9/2019 | Cheng .................. | G11B 5/6082 |
| 10,586,560 B1 * | 3/2020 | Wang .................... | G11B 5/314 |
| 2011/0038236 A1 * | 2/2011 | Mizuno ................. | G11B 5/314 369/13.24 |
| 2013/0064502 A1 * | 3/2013 | Peng ..................... | G11B 7/22 385/31 |
| 2013/0071062 A1 * | 3/2013 | Peng ..................... | G11B 5/314 385/31 |
| 2014/0043948 A1 * | 2/2014 | Hirata ................... | G11B 5/314 369/13.24 |
| 2014/0269237 A1 * | 9/2014 | Sasaki ................... | B23K 10/00 369/13.24 |

(Continued)

*Primary Examiner* — Allen T Cao
(74) *Attorney, Agent, or Firm* — Oliff PLC

(57) ABSTRACT

A near-field light generator includes a plasmon generator including a plasmon exciting portion on which a surface plasmon is excited, and a near-field transducer including a front end face that generates near-field light from the surface plasmon. The near-field transducer is formed of a first metal material. The plasmon generator includes a first portion formed of the first metal material and a second portion formed of a second metal material. The first portion is in contact with the near-field transducer. The second portion includes at least part of the plasmon exciting portion.

16 Claims, 28 Drawing Sheets

(56) References Cited

U.S. PATENT DOCUMENTS

2015/0255096 A1\* 9/2015 Sasaki .................... G11B 5/314
369/13.33

\* cited by examiner

NEAR-FIELD LIGHT GENERATOR AND THERMALLY-ASSISTED MAGNETIC RECORDING HEAD

BACKGROUND OF THE INVENTION

1. Field of the Invention

The present invention relates to a near-field light generator for use in thermally-assisted magnetic recording where a recording medium is irradiated with near-field light to lower the coercivity of the recording medium for data writing, and to a thermally-assisted magnetic recording head including the near-field light generator.

2. Description of the Related Art

With recent increases in recording density of magnetic recording devices such as magnetic disk drives, there has been demand for improved performance of thin-film magnetic heads and recording media. Among the thin-film magnetic heads, a composite thin-film magnetic head has been used widely. The composite thin-film magnetic head has such a structure that a read head unit including a magnetoresistive element (hereinafter, also referred to as MR element) for reading and a recording head unit including an induction-type electromagnetic transducer for writing are stacked on a substrate. In a magnetic disk drive, the thin-film magnetic head is mounted on a slider configured to slightly fly above the surface of a recording medium. The slider has a medium facing surface configured to face the recording medium.

To increase the recording density of a magnetic recording device, it is effective to make the magnetic fine particles of the recording medium smaller. Making the magnetic fine particles smaller, however, disadvantageously lowers the thermal stability of magnetization of the magnetic fine particles. To overcome this problem, it is effective to increase the anisotropic energy of the magnetic fine particles. However, increasing the anisotropic energy of the magnetic fine particles leads to an increase in coercivity of the recording medium, thereby making it difficult to perform data writing with existing magnetic heads.

As a solution to the problems described above, there has been proposed a technology called thermally-assisted magnetic recording. The technology uses a recording medium having high coercivity. When writing data, a write magnetic field and heat are applied almost simultaneously to the area of the recording medium where to write data, so that the area rises in temperature and drops in coercivity for data writing. The area where data is written subsequently falls in temperature and rises in coercivity to increase in thermal stability of magnetization. Hereinafter, a magnetic head for use in thermally-assisted magnetic recording will be referred to as a thermally-assisted magnetic recording head.

In thermally-assisted magnetic recording, near-field light is typically used as a means for applying heat to the recording medium. As a method for generating the near-field light, a method using a near-field light generator has been known. The near-field light generator includes a plasmon exciting portion on which surface plasmons are excited by laser light and an end face that generates near-field light from the surface plasmons. The laser light to be used for generating near-field light is typically emitted from a laser diode mounted on the slider, and is guided, by a waveguide provided in the slider, to the near-field light generator disposed near the medium facing surface of the slider.

U.S. Pat. Nos. 8,711,663 B1, 8,861,138 B2, and 9,754,614 B1 each disclose a thermally-assisted magnetic recording head including a plasmon generator as a near-field light generator. The thermally-assisted magnetic recording head further includes a waveguide. The plasmon generator has an end face located in the medium facing surface. The waveguide includes a core and a cladding. In this head, the surface of the core and the surface of the plasmon generator face each other with a gap interposed therebetween. This head is configured to excite surface plasmons on the plasmon generator by using evanescent light that is generated at the surface of the core from the light propagating through the core, and to generate near-field light from the excited surface plasmons at the end face of the plasmon generator.

In a thermally-assisted magnetic recording head, heat generated by the near-field light generator causes the near-field light generator to get hot. This results in the problem of deformation or breakage of the near-field light generator, thus shortening the life of the thermally-assisted magnetic recording head.

One of solutions to the aforementioned problem is to construct the near-field light generator to include a first metal portion and a second metal portion that are formed of mutually different metal materials, as disclosed in U.S. Pat. Nos. 8,711,663 B1, 8,861,138 B2, and 9,754,614 B1. The first metal portion has an end face located in the medium facing surface. The second metal portion has a front end that is closest to the medium facing surface and located at a distance from the medium facing surface. The second metal portion further has a plasmon exciting section to excite surface plasmons thereon. The surface plasmons excited on the plasmon exciting section propagate to the end face of the first metal portion located in the medium facing surface, and near-field light is generated from those excited surface plasmons at the end face of the first metal portion.

A metal suitable for excitation and propagation of surface plasmons, that is, a metal having high electrical conductivity such as Au is selected as the metal material to form the second metal portion. As the metal material to form the first metal portion, selected is one having higher hardness than the metal material used for the second metal portion. This serves to prevent the first metal portion from being deformed or broken.

An example of the near-field light generator including the first and second metal portions is the near-field light generator as disclosed in FIG. 1 of U.S. Pat. No. 8,711,663 B1, FIG. 23 of U.S. Pat. No. 8,861,138 B2, and FIG. 1 of U.S. Pat. No. 9,754,614 B1. This near-field light generator includes a second metal portion embedded in a cladding at a position away from the medium facing surface, and a first metal portion stacked on the second metal portion and the cladding. However, in the near-field light generator of such a structure, heat occurring from the first metal portion is conducted to the second metal portion to heat the second metal portion. This results in the problem that the second metal portion can be deformed so that the front end portion of the second metal portion gets away from the medium facing surface. The deformation of the second metal portion also leads to the problem that the first metal portion can be deformed to recede from the medium facing surface.

SUMMARY OF THE INVENTION

It is an object of the present invention to provide a near-field light generator of high reliability, and a thermally-assisted magnetic recording head including the near-field light generator.

A near-field light generator according to the present invention includes a plasmon generator including a plasmon exciting portion on which a surface plasmon is excited, and a near-field transducer including a front end face that generates near-field light from the surface plasmon. The near-field transducer is formed of a first metal material. The plasmon generator includes a first portion formed of the first metal material and a second portion formed of a second metal material. The first portion is in contact with the near-field transducer. The second portion includes at least part of the plasmon exciting portion.

A thermally-assisted magnetic recording head according to the present invention includes a medium facing surface that faces a recording medium, a main pole that generates a recording magnetic field for recording information on the recording medium, a waveguide including a core that propagates light and a cladding that is located around the core, and the near-field light generator according to the present invention. The front end face of the near-field transducer is located in the medium facing surface.

In the thermally-assisted magnetic recording head according to the present invention, the core may include an evanescent light generating surface that generates evanescent light from the light propagating through the core. In such a case, the surface plasmon may be excited on the plasmon exciting portion of the plasmon generator through coupling with the evanescent light.

In the thermally-assisted magnetic recording head according to the present invention, the plasmon generator may include an end that is closest to the medium facing surface and located at a distance from the medium facing surface.

In the near-field light generator and the thermally-assisted magnetic recording head according to the present invention, the second portion does not need to be in contact with the near-field transducer. Alternatively, the second portion may be in contact with the near-field transducer.

If the second portion is in contact with the near-field transducer, the near-field transducer may include a front portion and a rear portion that is located farther from the front end face than the front portion is. In such a case, the first portion of the plasmon generator may be in contact with the front portion of the near-field transducer. The second portion of the plasmon generator may be in contact with the rear portion of the near-field transducer.

In the near-field light generator and the thermally-assisted magnetic recording head according to the present invention, the plasmon generator may be a planar plasmon generator.

In the near-field light generator and the thermally-assisted magnetic recording head according to the present invention, the first metal material may be a PtAu alloy. The PtAu alloy may have a Pt content of 75 wt % or more and not more than 99 wt %. The second metal material may be Au.

According to the near-field light generator and the thermally-assisted magnetic recording head of the present invention, deformation of the plasmon generator can be suppressed. As a result, the reliability of the near-field light generator can be improved.

Other and further objects, features and advantages of the present invention will appear more fully from the following description.

DETAILED DESCRIPTION OF THE PREFERRED EMBODIMENTS

First Embodiment

Figure 3:
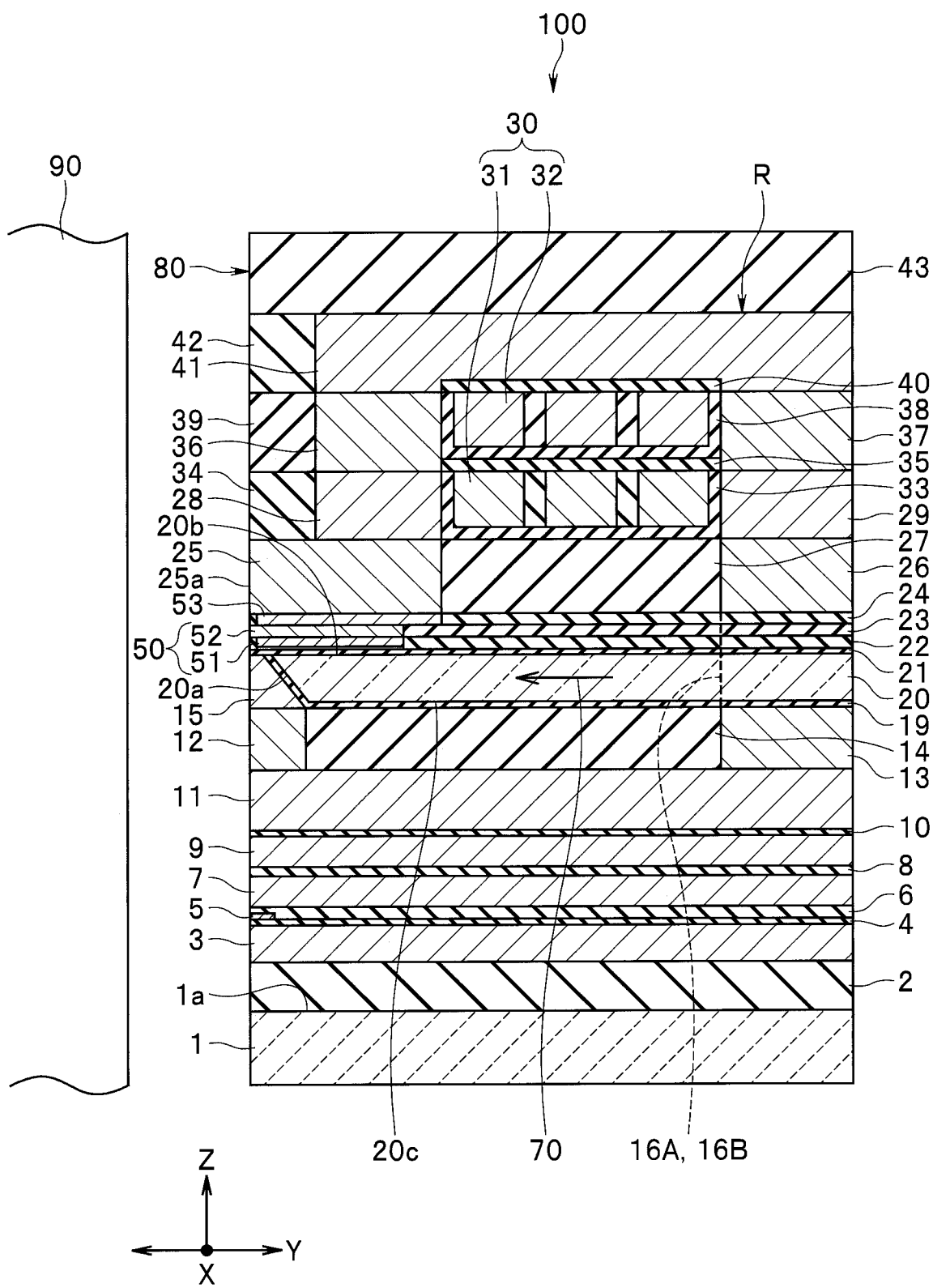
FIG. 3 is a cross-sectional view showing the configuration of the thermally-assisted magnetic recording head according to the first embodiment of the invention.
Figure 4:
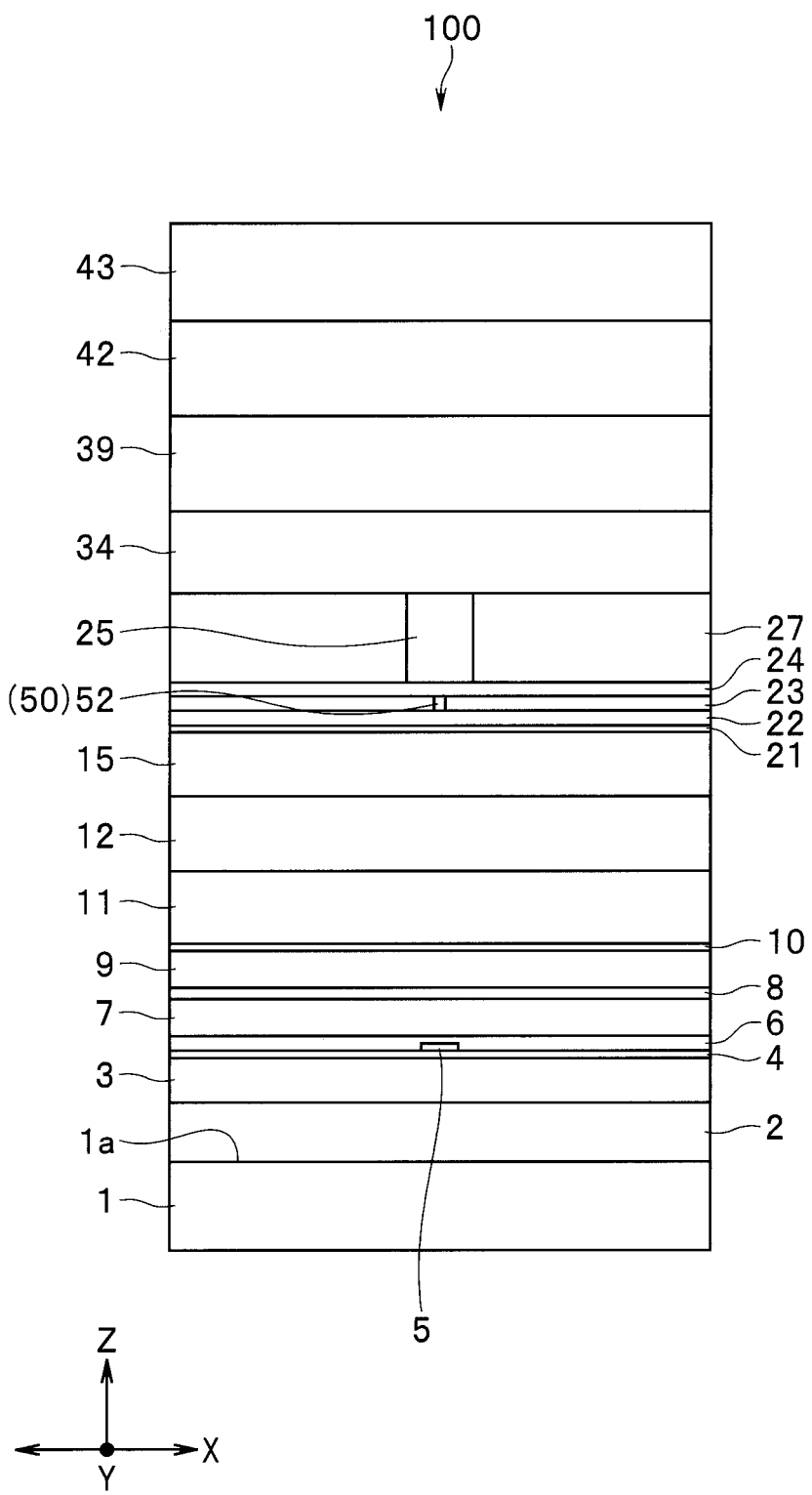
FIG. 4 is a front view showing the medium facing surface of the thermally-assisted magnetic recording head according to the first embodiment of the invention.

Preferred embodiments of the present invention will now be described in detail with reference to the drawings. First, reference is made to FIG. 3 and FIG. 4 to describe the configuration of a thermally-assisted magnetic recording head according to a first embodiment of the invention. FIG. 3 is a cross-sectional view showing the configuration of the thermally-assisted magnetic recording head. FIG. 4 is a front view showing the medium facing surface of the thermally-assisted magnetic recording head.

The thermally-assisted magnetic recording head 100 according to the present embodiment is intended for use in perpendicular magnetic recording, and is incorporated in a slider configured to fly over the surface of a rotating recording medium. The slider has a medium facing surface 80 configured to face a recording medium 90. When the recording medium 90 rotates, an airflow passing between the recording medium 90 and the slider causes a lift to be exerted on the slider. The lift causes the slider to fly over the surface of the recording medium 90.

As shown in FIG. 3, the thermally-assisted magnetic recording head 100 has the medium facing surface 80. Here, we define X direction, Y direction, and Z direction as follows. The X direction corresponds to the direction of track width of the recording medium 90. The Y direction is a direction perpendicular to the medium facing surface 80. The Z direction corresponds to the direction of track length of the recording medium 90, and is the direction of travel of the recording medium 90 as viewed from the slider. The X, Y, and Z directions are orthogonal to one another.

As shown in FIG. 3 and FIG. 4, the thermally-assisted magnetic recording head 100 includes: a substrate 1 formed of a ceramic material such as aluminum oxide-titanium carbide ($Al_2O_3$—TiC) and having a top surface 1a; an insulating layer 2 formed of an insulating material such as alumina ($Al_2O_3$) and disposed on the top surface 1a of the substrate 1; a bottom shield layer 3 formed of a magnetic material and disposed on the insulating layer 2; a bottom shield gap film 4 which is an insulating film disposed to cover the bottom shield layer 3; a magnetoresistive (MR) element 5 serving as a read element disposed on the bottom shield gap film 4; two leads (not shown) connected to the MR element 5; a top shield gap film 6 which is an insulating film disposed on the MR element 5; and a top shield layer 7 formed of a magnetic material and disposed on the top shield gap film 6. The Z direction is also a direction perpendicular to the top surface 1a of the substrate 1.

For the positions of components of the thermally-assisted magnetic recording head 100, the term □above □as used herein refers to positions located in a direction that is parallel to the Z direction and away from the top surface 1a with respect to a reference position, and □below□refers to positions located in a direction that is parallel to the Z direction and toward the top surface 1a with respect to the reference position. For the surfaces of the components of the thermally-assisted magnetic recording head 100, the term □top surface □as used herein refers to the surface farthest from the top surface 1a, and □bottom surface □refers to the surface closest to the top surface 1a.

An end of the MR element 5 is located in the medium facing surface 80. The MR element 5 may be an element formed of a magneto-sensitive film that exhibits a magnetoresistive effect, such as an anisotropic magnetoresistive (AMR) element, a giant magnetoresistive (GMR) element, or a tunneling magnetoresistive (TMR) element. The GMR element may be of either the current-in-plane (CIP) type in which a current for use in magnetic signal detection is fed in a direction generally parallel to the plane of layers constituting the GMR element or the current-perpendicular-to-plane (CPP) type in which the current for use in magnetic signal detection is fed in a direction generally perpendicular to the plane of the layers constituting the GMR element.

The parts from the bottom shield layer 3 to the top shield layer 7 constitute a read head unit. The thermally-assisted magnetic recording head 100 further includes an insulating layer 8 disposed on the top shield layer 7, a middle shield layer 9 formed of a magnetic material and disposed on the insulating layer 8, a nonmagnetic layer 10 formed of a nonmagnetic material and disposed on the middle shield layer 9, and a recording head unit disposed on the nonmagnetic layer 10. The middle shield layer 9 has the function of shielding the MR element 5 from magnetic fields generated in the recording head unit. The insulating layer 8 and the nonmagnetic layer 10 are formed of alumina, for example.

The recording head unit includes a coil 30 and a main pole 25. The coil 30 produces a magnetic field corresponding to data to be written on the recording medium 90. As shown in FIG. 3, the main pole 25 has a front end face 25a located in the medium facing surface 80. The main pole 25 is configured to pass a magnetic flux corresponding to the magnetic field produced by the coil 30, and to produce from the front end face 25a a write magnetic field for use to write data on the recording medium 90 by means of a perpendicular magnetic recording system. The coil 30 is formed of a conductive material such as copper. The main pole 25 is formed of a magnetic material.

The recording head unit further includes a shield 15. The shield 15 is formed of a magnetic metal. The shield 15 has an end face located in the medium facing surface 80.

The recording head unit further includes a return path section R formed of a magnetic material. The return path section R connects the main pole 25 and the shield 15 to each other, and passes a magnetic flux corresponding to the magnetic field produced by the coil 30. The return path section R includes a return pole layer 11, coupling layers 12, 13, 26, 28, 29, 36, and 37, two coupling sections 16A and 16B, and a yoke layer 41. The return pole layer 11 lies on the nonmagnetic layer 10. The return pole layer 11 has an end face located in the medium facing surface 80. The recording head unit further includes a not-shown insulating layer provided around the return pole layer 11. The not-shown insulating layer is formed of alumina, for example.

The coupling layer 12 lies on a first portion of the top surface of the return pole layer 11, the first portion being near the medium facing surface 80. The coupling layer 13 lies on a second portion of the top surface of the return pole layer 11, the second portion being located away from the medium facing surface 80. The coupling layer 12 has an end face located in the medium facing surface 80. The recording head unit further includes an insulating layer 14 lying on the not-shown insulating layer and a portion of the top surface of the return pole layer 11 other than the first and second portions. The insulating layer 14 is formed of alumina, for example.

The shield 15 is disposed on the coupling layer 12. The coupling sections 16A and 16B are disposed on the coupling layer 13. Each of the coupling sections 16A and 16B includes a first layer lying on the coupling layer 13, and a second layer lying on the first layer. The first layer of the coupling section 16A and the first layer of the coupling section 16B are aligned in the direction of track width (the X direction).

The recording head unit further includes a waveguide including a core 20 and a cladding, the core 20 allowing light to propagate therethrough, the cladding being provided around the core 20. The core 20 has an end face 20a facing toward the medium facing surface 80, an evanescent light generating surface 20b which is a top surface, a bottom surface 20c, and two side surfaces. The end face 20a is inclined such that the distance between the medium facing surface 80 and the end face 20a decreases with increasing distance between the end face 20a and the top surface 1a of the substrate 1.

The cladding includes cladding layers 19, 21, and 22, and a surrounding cladding layer (not shown). The cladding layer 19 lies on the coupling layer 13 and the insulating layer 14. The core 20 lies on the cladding layer 19. The cladding layer 19 is interposed between the shield 15 and the core 20 and between the insulating layer 14 and the core 20. The surrounding cladding layer lies on the cladding layer 19 and surrounds the core 20. The cladding layer 21 lies on the evanescent light generating surface 20b of the core 20 and the top surface of the surrounding cladding layer.

The core 20 is formed of a dielectric material that transmits laser light to be used for generating near-field light. The laser light emitted from a not-shown laser diode enters the core 20 and propagates through the core 20. The cladding is formed of a dielectric material that has a refractive index lower than that of the core 20. Examples of the material of the core 20 include tantalum oxide ($TaO_x$) and niobium oxide ($NbO_x$). Here, x represents an arbitrary number greater than 0. Examples of the material of the cladding include silicon oxide ($SiO_2$) and alumina.

The first layers of the coupling sections 16A and 16B are embedded in the cladding layer 19 and the surrounding cladding layer. The first layer of the coupling section 16A and the first layer of the coupling section 16B are located on opposite sides of the core 20 in the direction of track width (the X direction) and spaced from the core 20.

The recording head unit further includes a near-field light generator 50. The near-field light generator 50 is configured to excite surface plasmons thereon on the principle to be described later. As will be described in detail later, the near-field light generator 50 includes a plasmon generator (PG) 51 and a near-field transducer (NFT) 52. The plasmon generator 51 is located away from the medium facing surface 80. The near-field transducer 52 has a front end face located in the medium facing surface 80. Surface plasmons are excited on the plasmon generator 51 and the near-field transducer 52 from the light propagating through the core 20, and near-field light is generated from the surface plasmons at the front end face of the near-field transducer 52.

The plasmon generator 51 is located on the cladding layer 21. The cladding layer 22 is located on the cladding layer 21, around the plasmon generator 51. The near-field transducer 52 is located on the plasmon generator 51 and the cladding layer 22.

The recording head unit further includes a dielectric layer 23, a heat sink 53, and a dielectric layer 24. The dielectric layer 23 is located on the cladding layer 22, around the near-field transducer 52. The heat sink 53 is located on the near-field transducer 52 and the dielectric layer 23 at a distance from the medium facing surface 80. The dielectric layer 24 is located on the near-field transducer 52 and the dielectric layer 23, around the heat sink 53. The heat sink 53 is formed of one of Au, Cu, Ag, and Al, for example. The dielectric layers 23 and 24 are formed of silicon oxynitride (SiON), for example.

The main pole 25 is located on the heat sink 53 and the dielectric layer 24. The recording head unit may further include a separating film interposed between the main pole 25 and the heat sink 53. The separating film has the function of preventing the material of the heat sink 53 from diffusing into the main pole 25. The separating film is formed of Ru, Cr, Zr, Ti, or Ta, for example.

The second layers of the coupling sections 16A and 16B are embedded in the cladding layers 21 and 22 and the dielectric layers 23 and 24. The coupling layer 26 lies on the second layers of the coupling sections 16A and 16B and the dielectric layer 24. The recording head unit further includes a dielectric layer 27 located around the main pole 25 and the coupling layer 26. The dielectric layer 27 is formed of the same material as that of the cladding or the dielectric layers 23 and 24, for example.

The coupling layer 28 lies on the main pole 25. The coupling layer 28 has an end face facing toward the medium facing surface 80 and located at a distance from the medium facing surface 80. The coupling layer 29 lies on the coupling layer 26.

The coil 30 includes a first layer 31 and a second layer 32. The first layer 31 and the second layer 32 are connected in series, for example. The first layer 31 is wound around the coupling layer 29. The recording head unit further includes an insulating film 33, an insulating layer 34, and an insulating layer 35. The insulating film 33 is interposed between the first layer 31 and each of the coupling layers 28 and 29 and the dielectric layer 27. The insulating layer 34 lies around the first layer 31 and the coupling layer 28 and in the space between adjacent turns of the first layer 31. The insulating layer 35 lies on the first layer 31, the insulating film 33, and the insulating layer 34. The insulating film 33 and the insulating layers 34 and 35 are formed of alumina, for example.

The coupling layer 36 lies on the coupling layer 28. The coupling layer 36 has an end face facing toward the medium facing surface 80 and located at a distance from the medium facing surface 80. The coupling layer 37 lies on the coupling layer 29.

The second layer 32 of the coil 30 lies above the first layer 31. The second layer 32 is wound around the coupling layer 37. The recording head unit further includes an insulating film 38, an insulating layer 39, and an insulating layer 40. The insulating film 38 is interposed between the second layer 32 and each of the coupling layers 36 and 37 and the insulating layer 35. The insulating layer 39 lies around the second layer 32 and the coupling layer 36 and in the space between adjacent turns of the second layer 32. The insulating layer 40 lies on the second layer 32, the insulating film 38, and the insulating layer 39. The insulating film 38 and the insulating layers 39 and 40 are formed of alumina, for example.

The yoke layer 41 lies on the coupling layers 36 and 37 and the insulating layer 40. The yoke layer 41 has an end face facing toward the medium facing surface 80 and located at a distance from the medium facing surface 80. The recording head unit further includes an insulating layer 42 provided around the yoke layer 41. The insulating layer 42 is formed of alumina, for example.

As shown in FIG. 3 and FIG. 4, the thermally-assisted magnetic recording head 100 further includes a protective layer 43 disposed to cover the recording head unit. The protective layer 43 is formed of alumina, for example.

As has been described, the thermally-assisted magnetic recording head 100 according to the present embodiment includes the medium facing surface 80, the read head unit, and the recording head unit. The read head unit and the recording head unit are stacked on the substrate 1. The recording head unit is located on the trailing side, i.e., the front side in the direction of travel of the recording medium 90 (the Z direction), relative to the read head unit.

The recording head unit includes the coil 30, the main pole 25, the waveguide, the near-field light generator 50, the heat sink 53, the shield 15, and the return path section R. The near-field light generator 50 and the main pole 25 are located on the front side in the direction of travel of the recording medium 90 relative to the core 20 of the waveguide.

The shield 15 and the return path section R have the function of allowing a magnetic flux that has been produced from the front end face 25a of the main pole 25 and has magnetized a portion of the recording medium 90 to flow back to the main pole 25.

Figure 1:
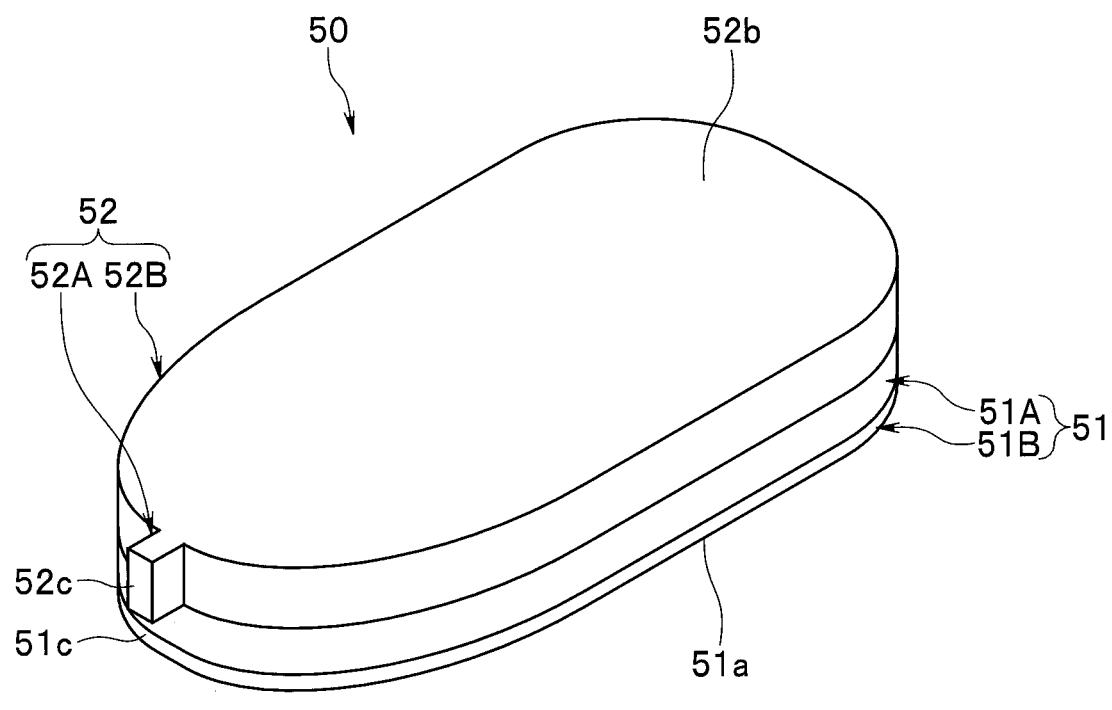
FIG. 1 is a perspective view showing a near-field light generator according to a first embodiment of the invention.
Figure 1:
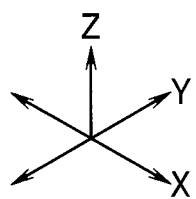
Figure 2:
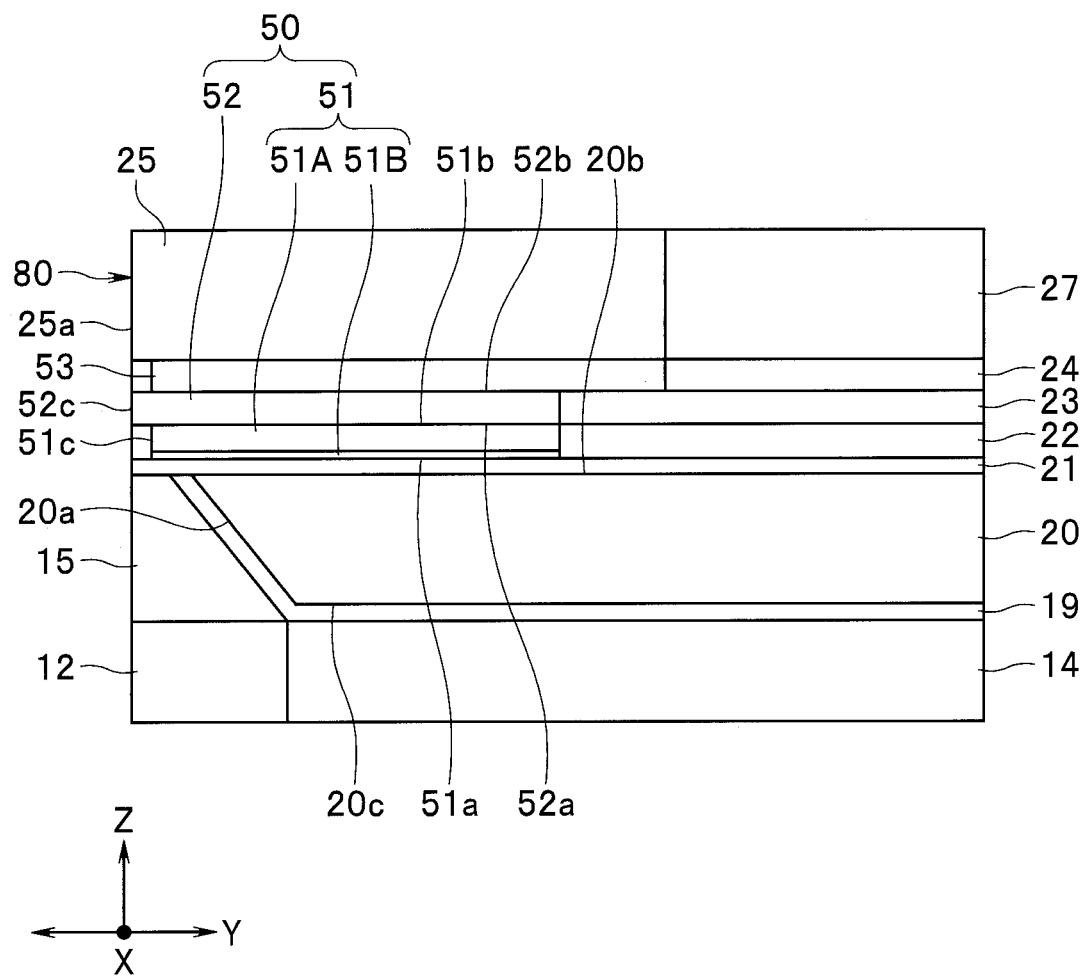
FIG. 2 is a cross-sectional view showing essential parts of a thermally-assisted magnetic recording head according to the first embodiment of the invention.

The near-field light generator 50 will now be described in detail with reference to FIG. 1 and FIG. 2. FIG. 1 is a perspective view showing the near-field light generator 50. FIG. 2 is a cross-sectional view showing essential parts of the thermally-assisted magnetic recording head 100. FIGS. 1 and 2 also show the X, Y, and Z directions mentioned previously.

The plasmon generator 51 of the near-field light generator 50 is a so-called planar plasmon generator (PPG). The plasmon generator 51 has a thickness (dimension in the Z direction) in the range of 20 to 60 nm, for example.

The plasmon generator 51 includes a plasmon exciting portion 51a configured to excite surface plasmons thereon. The plasmon exciting portion 51a is located at a predetermined distance from the evanescent light generating surface 20b of the core 20 and faces the evanescent light generating surface 20b. The cladding layer 21 is interposed between the evanescent light generating surface 20b and the plasmon exciting portion 51a.

The plasmon exciting portion 51a is also the bottom surface of the plasmon generator 51. The plasmon generator 51 further includes a top surface 51b and an end 51c that is closest to the medium facing surface 80 and located at a distance from the medium facing surface 80. The distance from the medium facing surface 80 to the end 51c is in the range of 10 nm to 50 nm, for example.

The near-field transducer 52 of the near-field light generator 50 has a bottom surface 52a and a top surface 52b. The bottom surface 52a of the near-field transducer 52 is in contact with the top surface 51b of the plasmon generator 51. The top surface 52b of the near-field transducer 52 is in contact with the heat sink 53.

The near-field transducer 52 further includes a front end face 52c that generates near-field light from the surface plasmons. The front end face 52c is located in the medium facing surface 80. The front end face 52c generates near-field light on the principle to be described later.

The near-field transducer 52 includes a narrow portion 52A including the front end face 52c, and a wide portion 52B which is located farther from the medium facing surface 80 than is the narrow portion 52A. The width of the narrow portion 52A in the track width direction (the X direction) may be constant regardless of distance from the medium facing surface 80, or may decrease toward the medium facing surface 80. The wide portion 52B has a maximum width greater than that of the narrow portion 52A in the track width direction (the X direction).

The width (the dimension in the track width direction (the X direction) of the front end face 52c is defined by the width of the narrow portion 52A in the medium facing surface 80. The width of the front end face 52c falls within the range of 5 to 40 nm, for example. The height (the dimension in the Z direction) of the front end face 52c is defined by the thickness (the dimension in the Z direction) of the narrow portion 52A in the medium facing surface 80. The height of the front end face 52c falls within the range of 5 to 40 nm, for example.

As described above, the near-field transducer 52 includes the front end face 52c that generates near-field light. Part of the energy of the near-field light is converted into heat in the near-field transducer 52. To avoid deformation or breakage due to the heat generation, the near-field transducer 52 is formed of a metal material having high hardness. The metal material used to form the near-field transducer 52 will hereinafter be referred to as a first metal material.

The plasmon generator is typically formed of a metal material suitable for excitation and propagation of surface plasmons. A metal material having such a characteristic will hereinafter be referred to as a second metal material. The second metal material may have electrical conductivity higher than that of the first metal material. The first metal material may have Vickers hardness higher than that of the second metal material.

In the present embodiment, the plasmon generator 51 includes a first portion 51A formed of the first metal material and a second portion 51B formed of the second metal material. The first portion 51A is in contact with the near-field transducer 52. The second portion 51B includes at least part of the plasmon exciting portion 51a. In particular, in the present embodiment, the second portion 51B includes the entire plasmon exciting portion 51a. The first portion 51A is stacked on the second portion 51B and covers the entire top surface of the second portion 51B. The second portion 51B is therefore not in contact with the near-field transducer 52.

The first metal material may contain any one of Rh, Ir, Ru, and Pt, and is particularly preferably a PtAu alloy. The PtAu alloy preferably has a Pt content of 75 wt % or more and not more than 99 wt %. The reason will be described later. The second metal material may contain any one of Au, Cu, Ag, and Al, and is particularly preferably Au.

Now, the principle of generation of near-field light in the present embodiment and the principle of thermally-assisted magnetic recording using near-field light will be described in detail. Laser light emitted from a laser diode (not shown) enters the core 20. As shown in FIG. 3, the laser light 70 propagates through the core 20 toward the medium facing surface 80 and reaches the vicinity of the plasmon generator 51 of the near-field light generator 50. The evanescent light generating surface 20b of the core 20 generates evanescent light from the laser light 70 propagating through the core 20. More specifically, the laser light 70 is totally reflected at the evanescent light generating surface 20b, and this causes the evanescent light generating surface 20b to generate evanescent light permeating into the cladding layer 21. In the plasmon generator 51, surface plasmons are excited on the plasmon exciting portion 51a through coupling with the aforementioned evanescent light. The excited surface plasmons propagate to the front end face 52c through the plasmon generator 51 and the near-field transducer 52. The near-field transducer 52 generates near-field light from those surface plasmons at the front end face 52c.

The near-field light generated at the front end face 52c is projected toward the recording medium 90, reaches the surface of the recording medium 90 and heats a part of the magnetic recording layer of the recording medium 90. This lowers the coercivity of the part of the magnetic recording layer. In thermally-assisted magnetic recording, the part of the magnetic recording layer with the lowered coercivity is subjected to a write magnetic field produced by the main pole 25 for data writing.

Next, functions and effects specific to the near-field light generator 50 and the thermally-assisted magnetic recording head 100 according to the present embodiment will be described. As described above, part of the energy of the near-field light generated at the front end face 52c of the near-field transducer 52 is converted into heat. Part of the energy of the light guided through the core 20 of the waveguide to the vicinity of the plasmon generator 51 is also converted into heat. The near-field light generator 50 thus rises in temperature during operation of the thermally-assisted magnetic recording head 100.

In the present embodiment, the near-field transducer 52 is formed of the first metal material. The plasmon generator 51 includes the first portion 51A formed of the first metal material and the second portion 51B formed of the second metal material. The first metal material has high hardness and is suitable for the formation of the near-field transducer 52. According to the present embodiment, deformation of the plasmon generator 51 due to the heat generation of the near-field light generator 50 can thus be suppressed, compared to the case where the entire plasmon generator 51 is formed of the second metal material. Moreover, according to the present embodiment, deformation of the near-field transducer 52 due to the deformation of the plasmon generator 51 can be suppressed.

Locating the main part of the second portion 51B away from the near-field transducer 52 can suppress the deformation of the second portion 51B due to the heat generation of the near-field transducer 52. For example, the main part of the second portion 51B refers to a part including the plasmon exciting portion 51a of the plasmon generator 51. In the present embodiment, the first portion 51A is in contact with the near-field transducer 52, and the second portion 51B is not in contact with the near-field transducer 52. In the present embodiment, the second portion 51B is thus located farther from the near-field transducer 52 than the first portion 51A is. According to the present embodiment, the deformation of the second portion 51B can thus be suppressed.

A method of manufacturing the thermally-assisted magnetic recording head 100 according to the present embodiment will now be described. The method of manufacturing the thermally-assisted magnetic recording head 100 includes the steps of: forming components of a plurality of thermally-assisted magnetic recording heads 100, except the substrates 1, on a wafer that includes portions to become the substrates 1 of the plurality of thermally-assisted magnetic recording heads 100, thereby fabricating a substructure including a plurality of pre-head portions arranged in rows, the plurality of pre-head portions becoming individual thermally-assisted magnetic recording heads 100 later; and cutting the substructure to separate the plurality of pre-head portions from each other and forming the medium facing surface 80 for each of the plurality of pre-head portions (this step will be referred to as the step of forming the medium facing surface 80). A plurality of thermally-assisted magnetic recording heads 100 are produced in this manner.

The method of manufacturing the thermally-assisted magnetic recording head 100 according to the present embodiment will be described in more detail below with attention focused on a single thermally-assisted magnetic recording head 100. The following descriptions include the description of a method of manufacturing the near-field light generator 50 according to the present embodiment. The method of manufacturing the thermally-assisted magnetic recording head 100 starts with forming the insulating layer 2, the bottom shield layer 3, and the bottom shield gap film 4 in this order on the substrate 1. Then, the MR element 5 and two leads (not shown) connected to the MR element 5 are formed on the bottom shield gap film 4. The top shield gap film 6 is then formed to cover the MR element 5 and the leads. Next, the top shield layer 7, the insulating layer 8, the middle shield layer 9, and the nonmagnetic layer 10 are formed in this order on the top shield gap film 6.

The return pole layer 11 is then formed on the nonmagnetic layer 10. Next, a not-shown insulating layer is formed to cover the return pole layer 11. The not-shown insulating layer is then polished by, for example, chemical mechanical polishing (hereinafter referred to as CMP), until the return pole layer 11 is exposed. Next, the coupling layers 12 and 13 are formed on the return pole layer 11. Then, the insulating layer 14 is formed over the entire top surface of the stack. The insulating layer 14 is then polished by, for example, CMP, until the coupling layers 12 and 13 are exposed.

Reference is now made to FIG. 5A to FIG. 17B to describe steps to be performed after the polishing of the insulating layer 14 up to the formation of the main pole 25. FIG. 5A to FIG. 17B each show a stack of layers formed in the process of manufacturing the thermally-assisted magnetic recording head 100. Fig. nA (n is an integer between 5 and 17 inclusive) shows a cross section that intersects the front end face 25a of the main pole 25 and that is perpendicular to the medium facing surface 80 and to the top surface 1a of the substrate 1. Fig. nB shows a cross section of the stack taken at the location at which the medium facing surface 80 is to be formed. In Fig. nA, the symbol □ABS□indicates the location at which the medium facing surface 80 is to be formed. Fig. nA and Fig. nB omit the showing of portions located below the coupling layer 12 and the insulating layer 14.

Figure 5A:
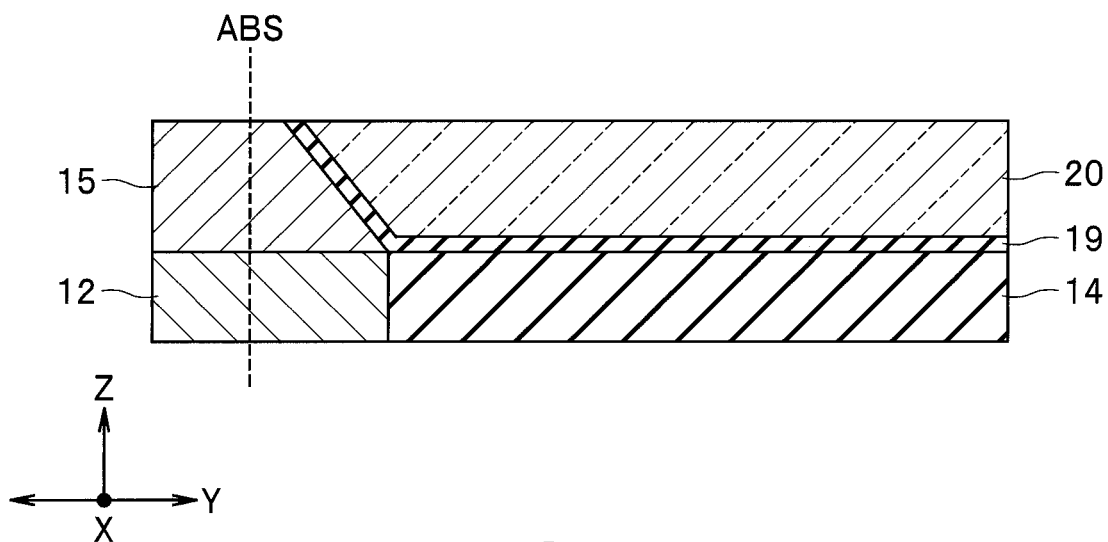
FIGS. 5A and 5B are cross-sectional views showing a step of a manufacturing method for the thermally-assisted magnetic recording head according to the first embodiment of the invention.
Figure 5B:
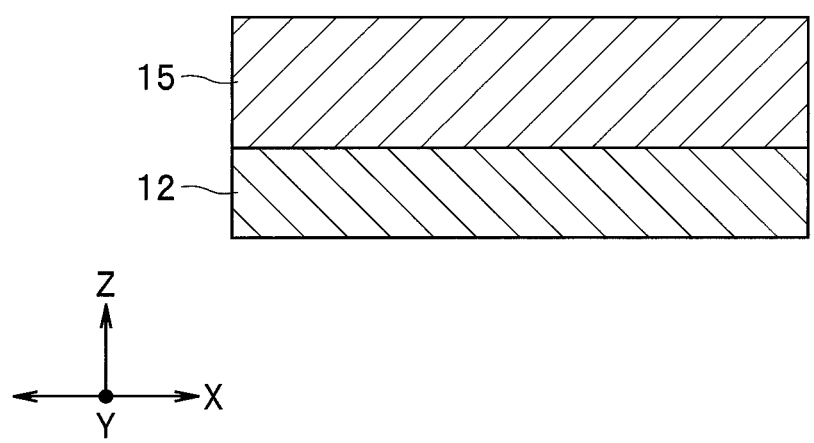

FIG. 5A and FIG. 5B show a step that follows the polishing of the insulating layer 14. In this step, the shield 15 is first formed on the coupling layer 12. Next, the cladding layer 19 is formed over the entire top surface of the stack. The cladding layer 19 is then selectively etched to form therein two openings for exposing the top surface of the coupling layer 13. Next, the first layers of the coupling sections 16A and 16B are formed on the coupling layer 13 at the locations of the two openings. The core 20 is then formed on the cladding layer 19. Next, the surrounding cladding layer is formed over the entire top surface of the stack. The surrounding cladding layer and the cladding layer 19 are then polished by, for example, CMP until the core 20 and the first layers of the coupling sections 16A and 16B are exposed.

Figure 6A:
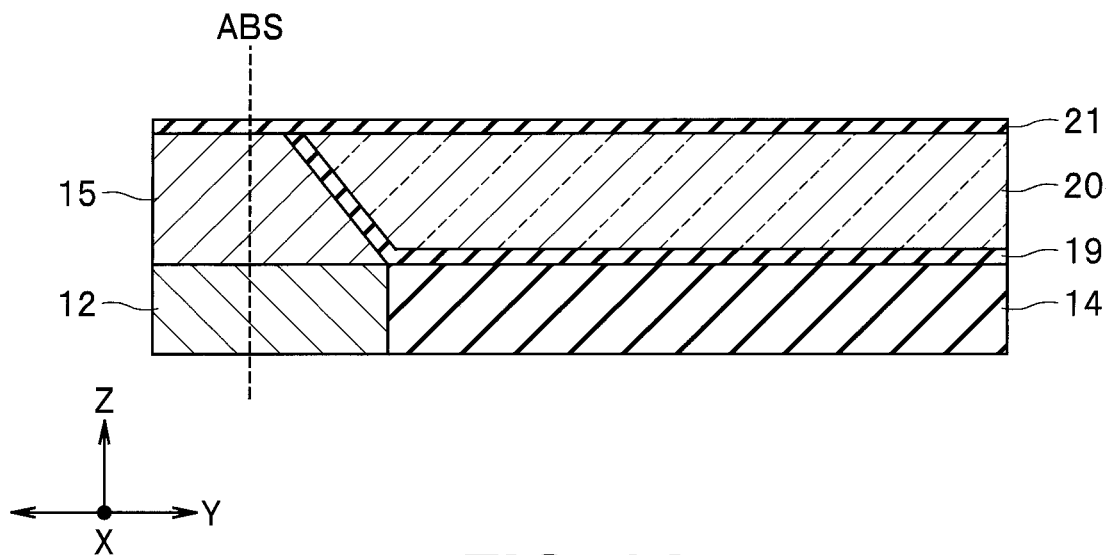
FIGS. 6A and 6B are cross-sectional views showing a step that follows the step shown in FIGS. 5A and 5B.
Figure 6B:
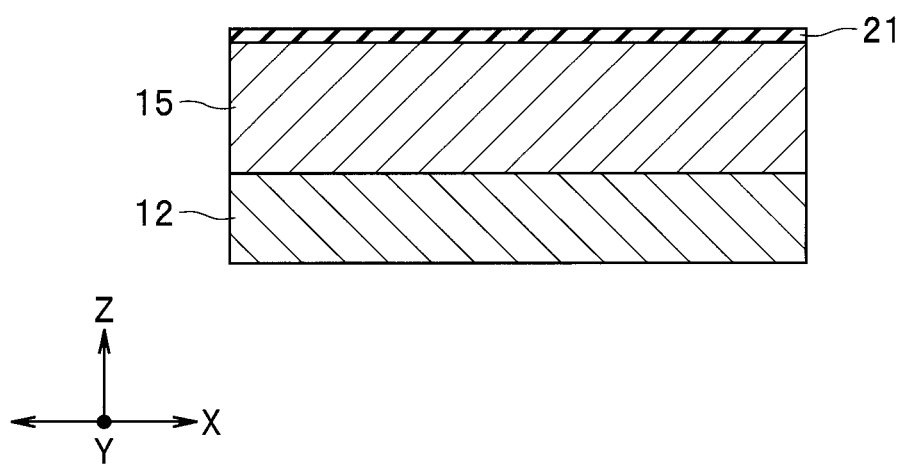

FIG. 6A and FIG. 6B show the next step. In this step, the cladding layer 21 is formed over the entire top surface of the stack.

Figure 7A:
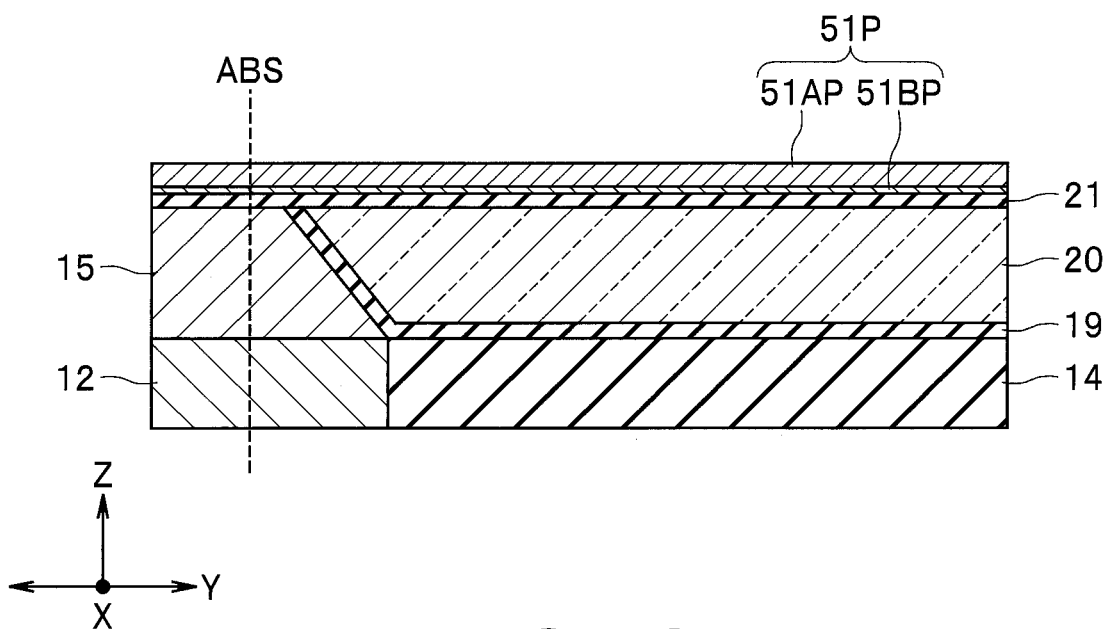
FIGS. 7A and 7B are cross-sectional views showing a step that follows the step shown in FIGS. 6A and 6B.
Figure 7B:
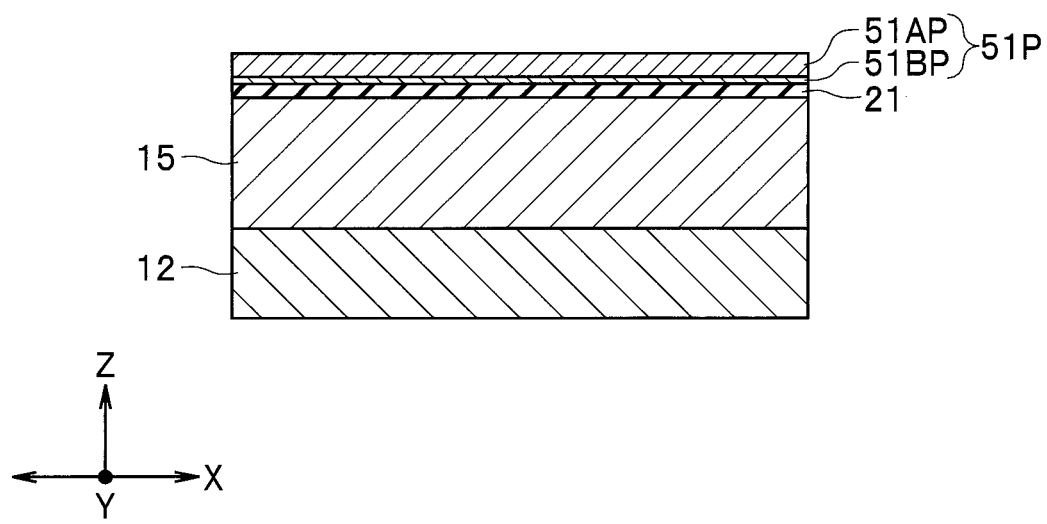

FIG. 7A and FIG. 7B show the next step. In this step, an initial plasmon generator 51P is formed on the cladding layer 21 by sputtering, for example. The initial plasmon generator 51P includes a second metal film 51BP formed of the second metal material on the cladding layer 21 and a first metal film 51AP formed of the first metal material on the second metal film 51BP. An adhesion layer may be formed between the cladding layer 21 and the initial plasmon generator 51P if needed.

Figure 8A:
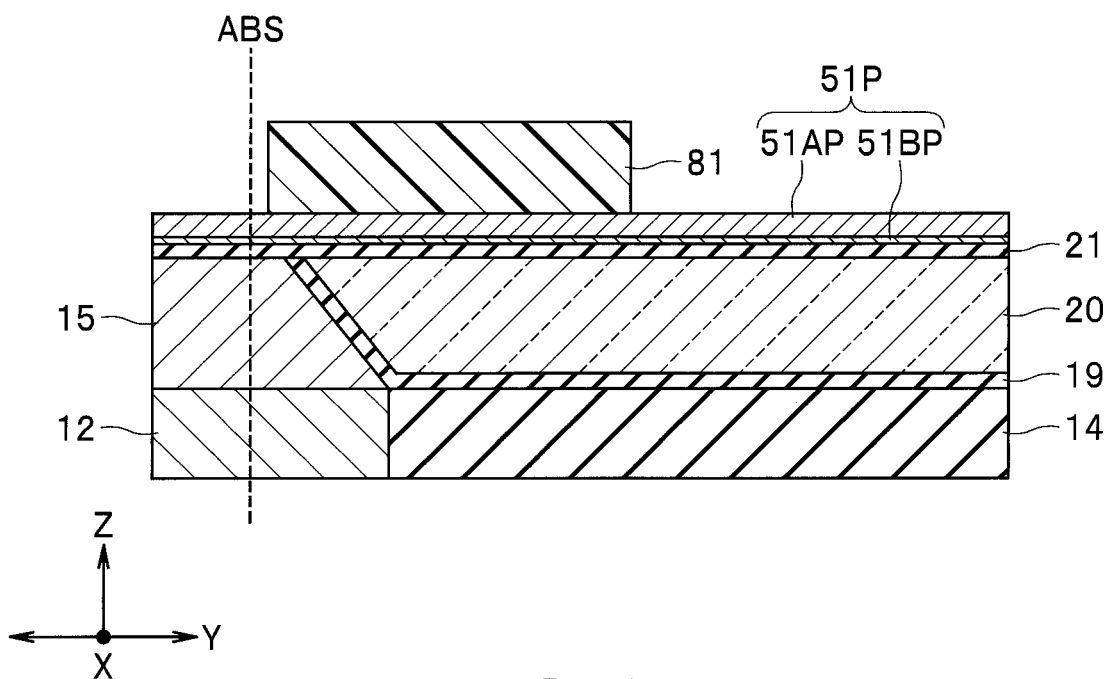
FIGS. 8A and 8B are cross-sectional views showing a step that follows the step shown in FIGS. 7A and 7B.
Figure 8B:
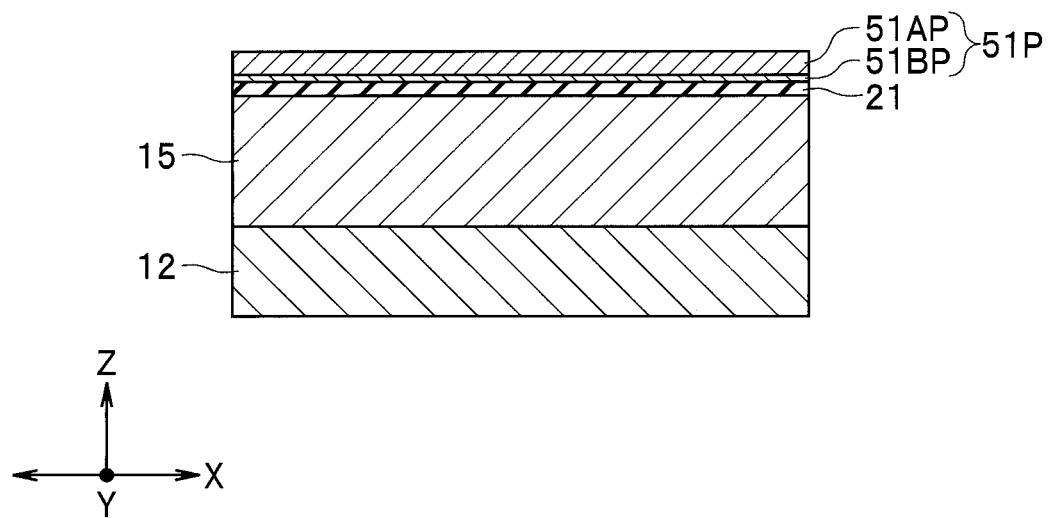

FIG. 8A and FIG. 8B show the next step. In this step, a photoresist mask 81 is formed on the initial plasmon generator 51P. The photoresist mask 81 is formed by patterning a photoresist layer by photolithography. Other photoresist masks to be used in later steps will be formed in the same manner as the photoresist mask 81. The photoresist mask 81 has the same planar shape (shape seen from above) as that of the plasmon generator 51 to be formed later.

Figure 9A:
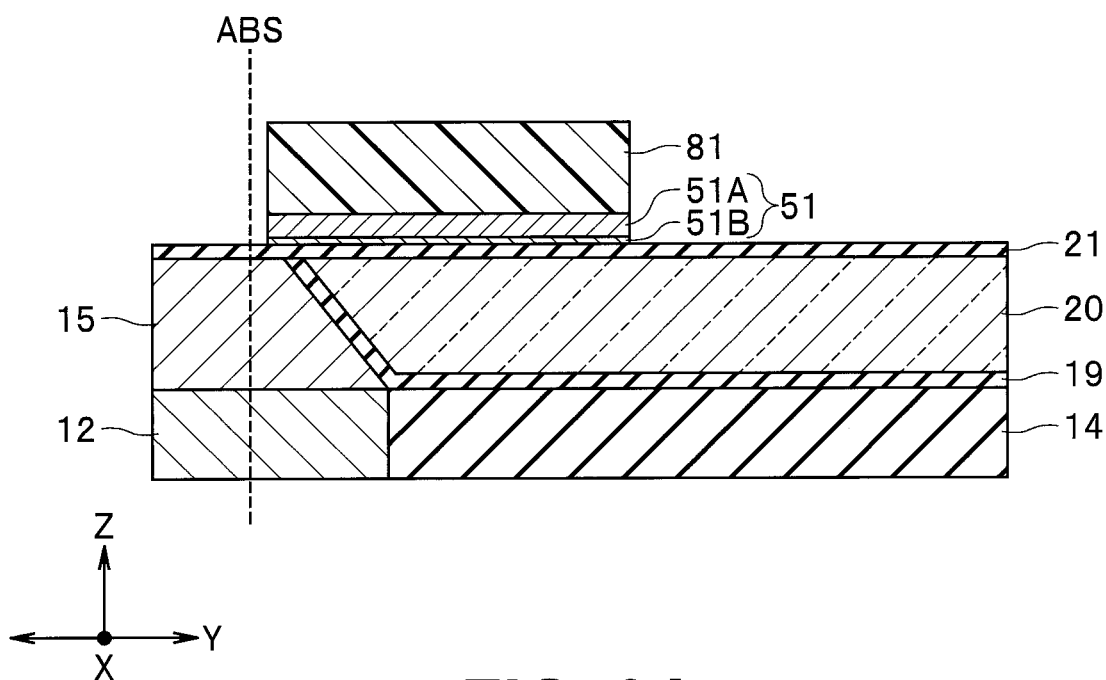
FIGS. 9A and 9B are cross-sectional views showing a step that follows the step shown in FIGS. 8A and 8B.
Figure 9B:
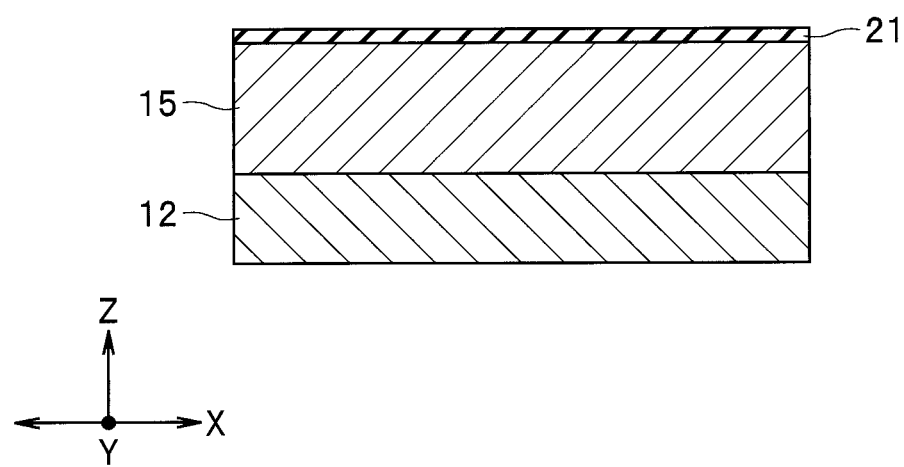

FIG. 9A and FIG. 9B show the next step. In this step, the initial plasmon generator 51P is etched by, for example, ion beam etching (hereinafter, referred to as IBE) using the photoresist mask 81 as the etching mask. This etching makes the first metal film 51AP into the first portion 51A, the second metal film 51BP into the second portion 51B, and the initial plasmon generator 51P into the plasmon generator 51.

Figure 10A:
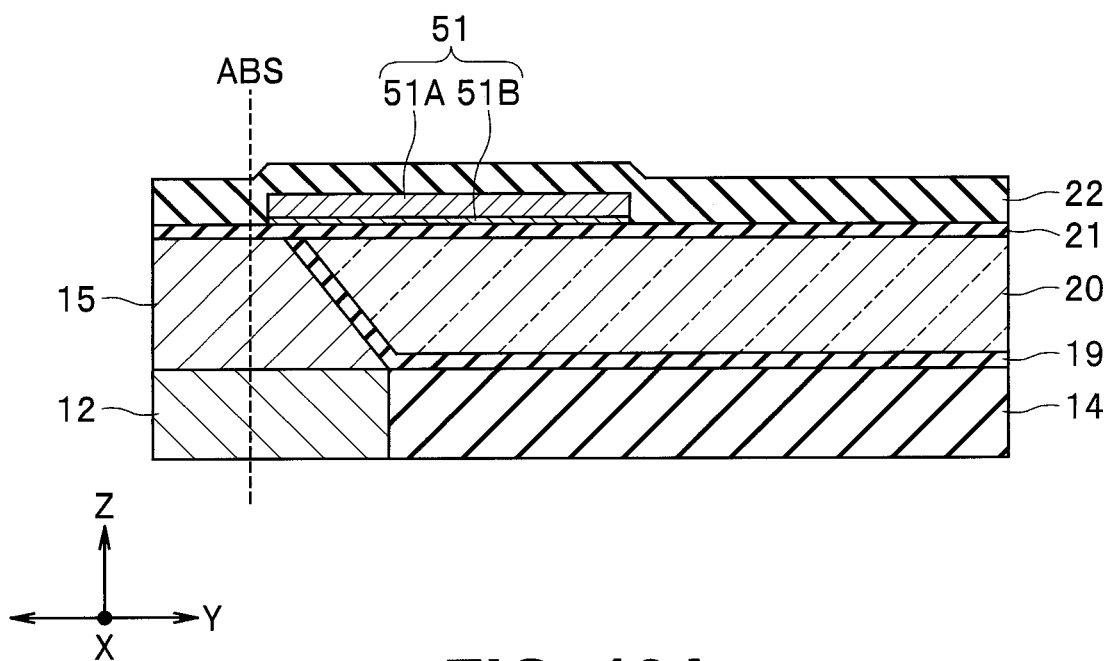
FIGS. 10A and 10B are cross-sectional views showing a step that follows the step shown in FIGS. 9A and 9B.
Figure 10B:
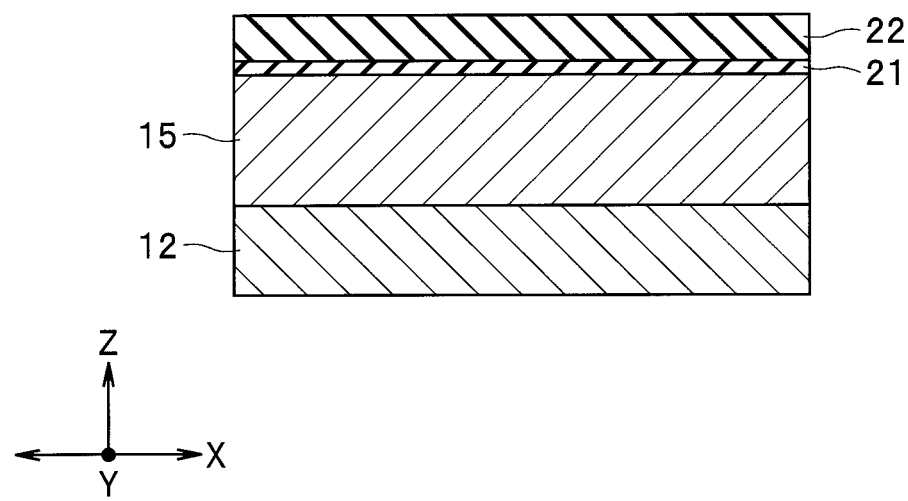

FIG. 10A and FIG. 10B show the next step. In this step, the photoresist mask 81 is initially removed. Next, the cladding layer 22 is formed over the entire top surface of the stack.

Figure 11A:
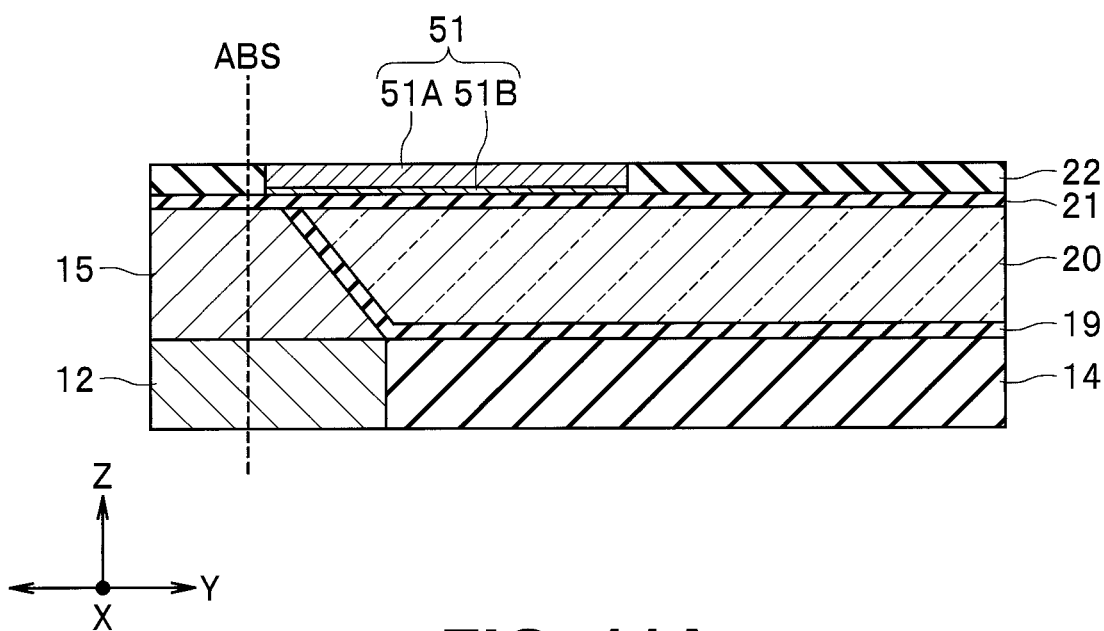
FIGS. 11A and 11B are cross-sectional views showing a step that follows the step shown in FIGS. 10A and 10B.
Figure 11B:
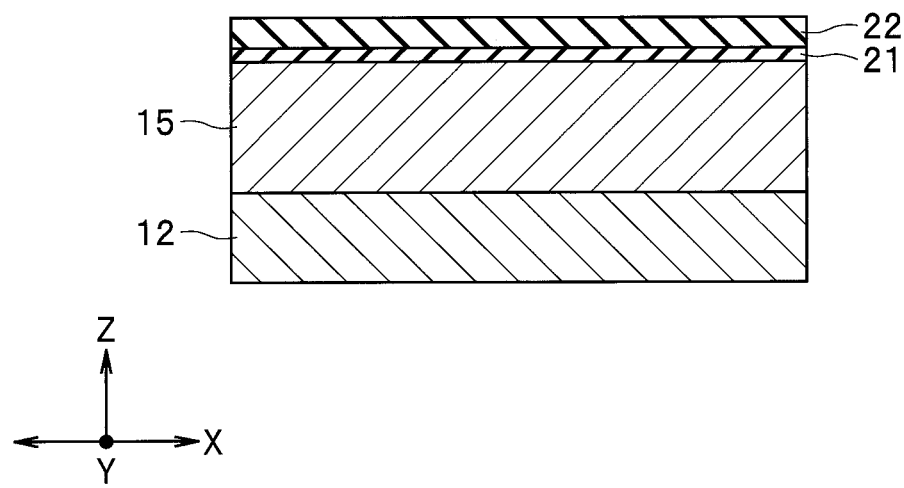

FIG. 11A and FIG. 11B show the next step. In this step, the cladding layer 22 is polished by, for example, CMP, until the plasmon generator 51 is exposed.

Figure 12A:
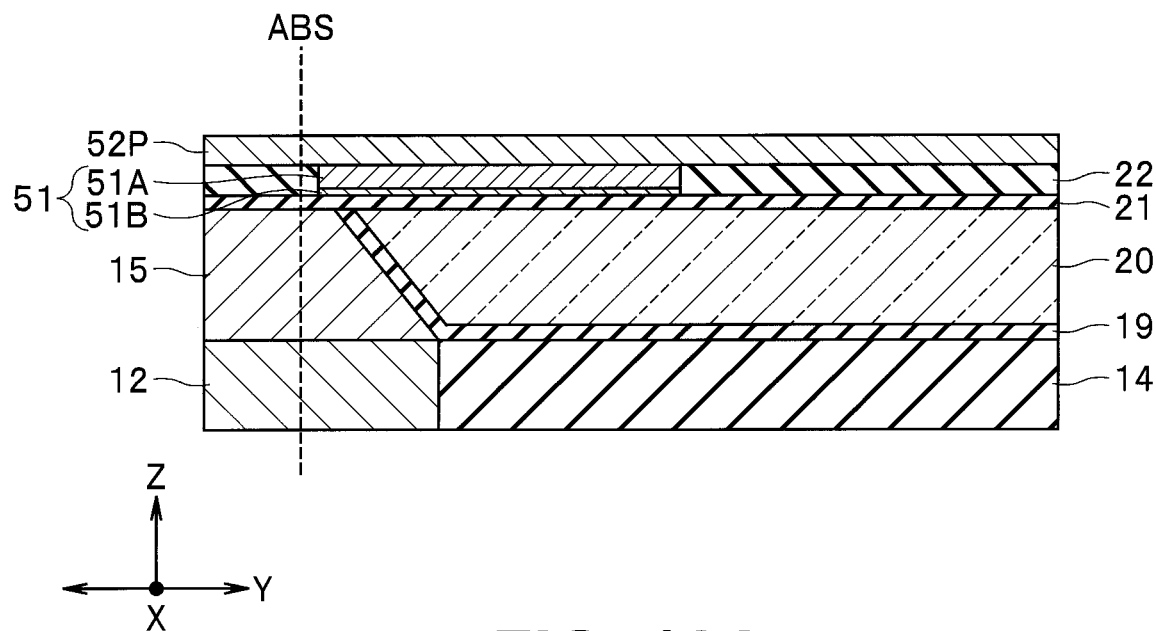
FIGS. 12A and 12B are cross-sectional views showing a step that follows the step shown in FIGS. 11A and 11B.
Figure 12B:
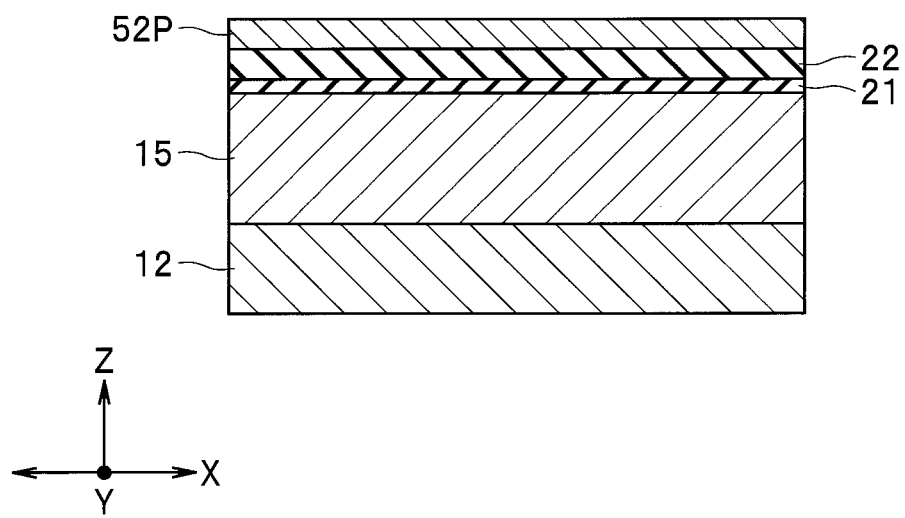

FIG. 12A and FIG. 12B show the next step. In this step, a metal film 52P is formed of the first metal material on the plasmon generator 51 and the cladding layer 22 by sputtering, for example.

Figure 13A:
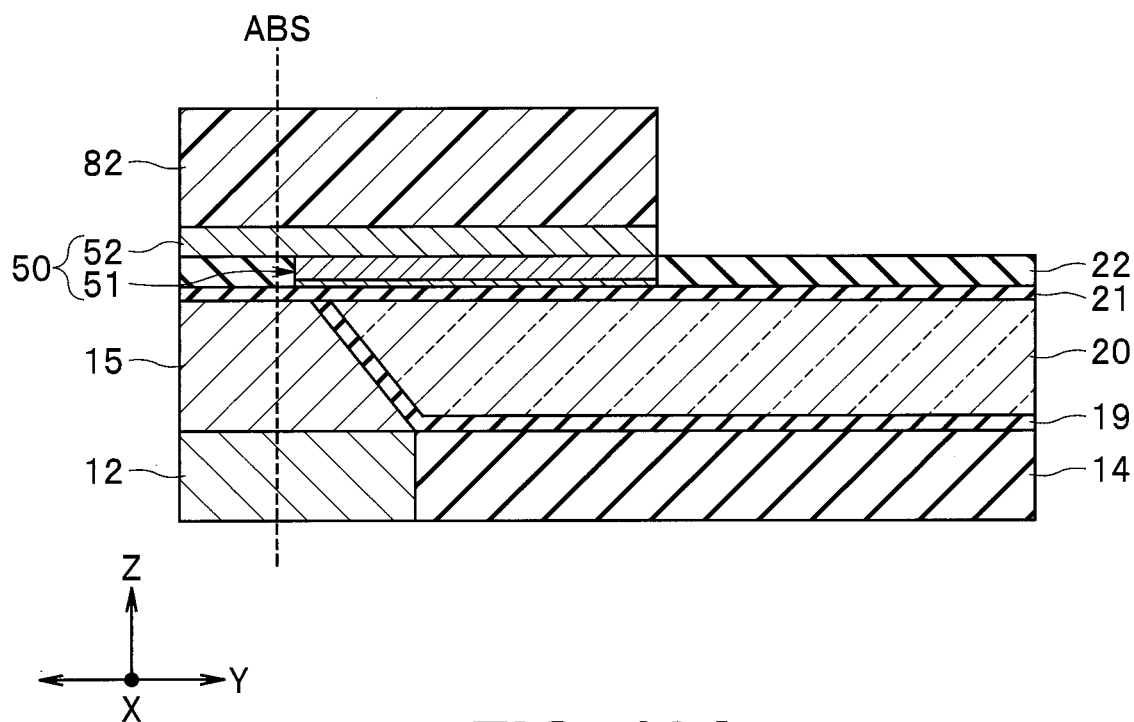
FIGS. 13A and 13B are cross-sectional views showing a step that follows the step shown in FIGS. 12A and 12B.
Figure 13B:
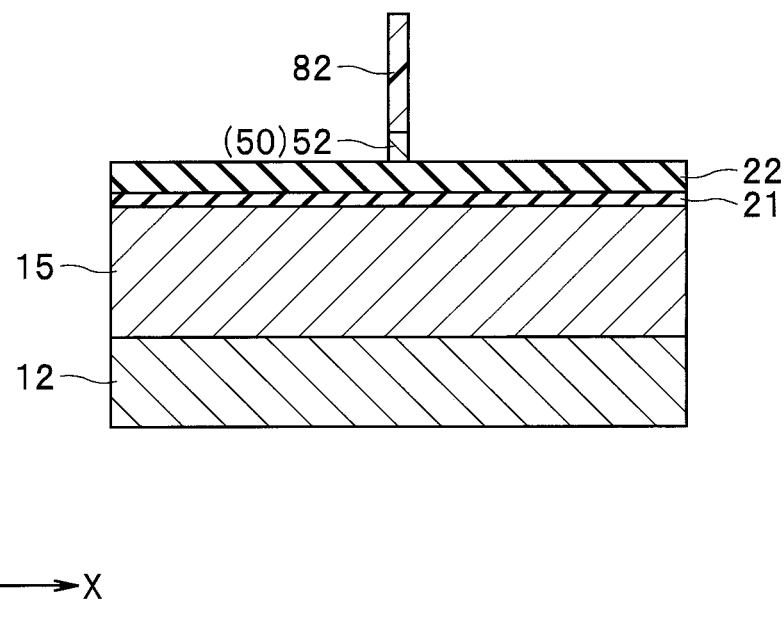

FIG. 13A and FIG. 13B show the next step. In this step, a photoresist mask 82 is initially formed on the metal film 52P. The photoresist mask 82 includes a portion having a planar shape corresponding to that of the narrow portion 52A of the near-field transducer 52 to be formed later and a portion having a planar shape corresponding to that of the wide portion 52B of the near-field transducer 52 to be formed later. Next, the metal film 52P is etched by, for example, IBE, using the photoresist mask 82 as the etching mask. This etching makes the metal film 52P into the near-field transducer 52. The near-field light generator 50 is thereby completed.

Figure 14A:
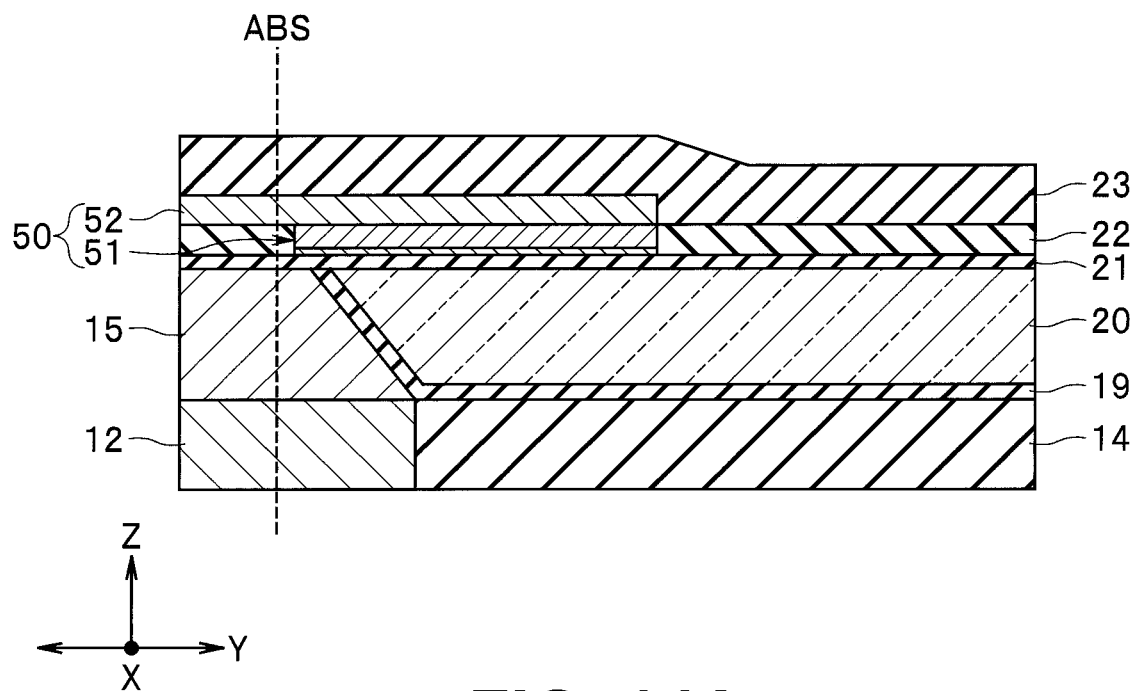
FIGS. 14A and 14B are cross-sectional views showing a step that follows the step shown in FIGS. 13A and 13B.
Figure 14B:
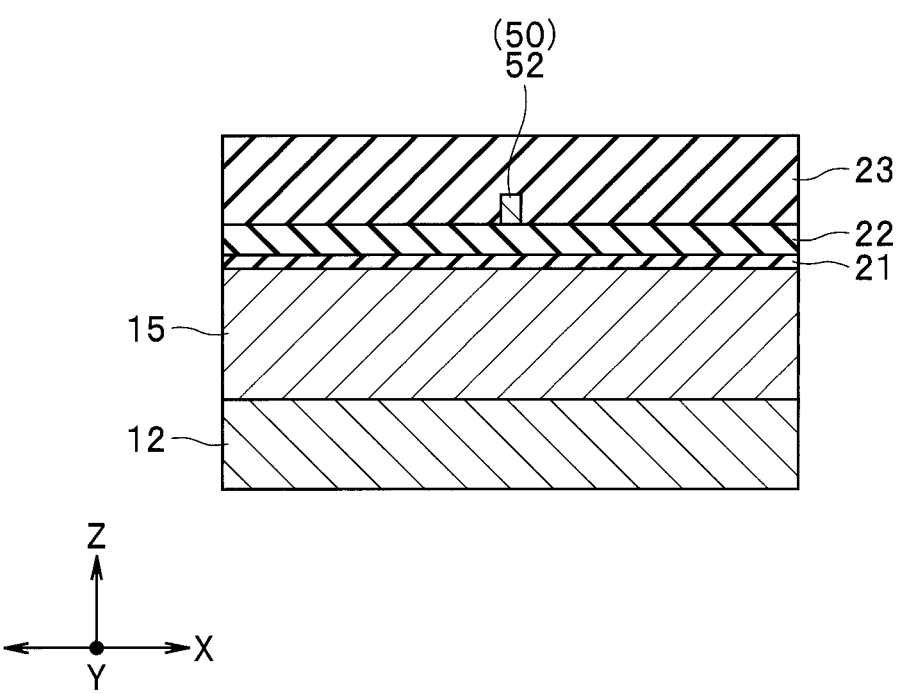

FIG. 14A and FIG. 14B show the next step. In this step, the photoresist mask 82 is initially removed. Next, the dielectric layer 23 is formed over the entire top surface of the stack.

Figure 15A:
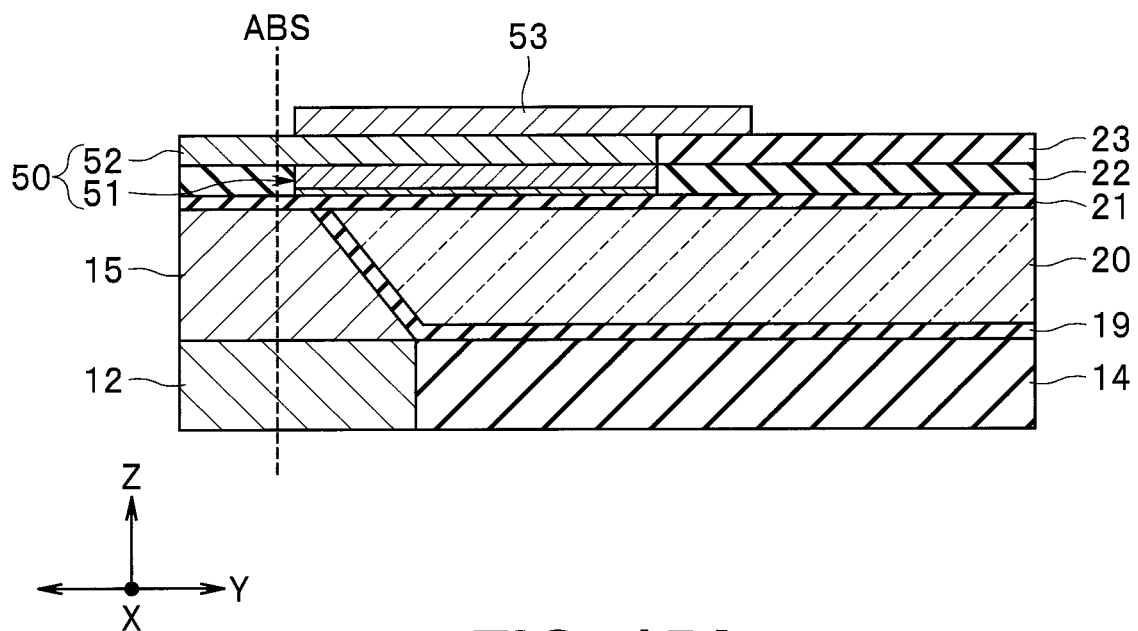
FIGS. 15A and 15B are cross-sectional views showing a step that follows the step shown in FIGS. 14A and 14B.
Figure 15B:
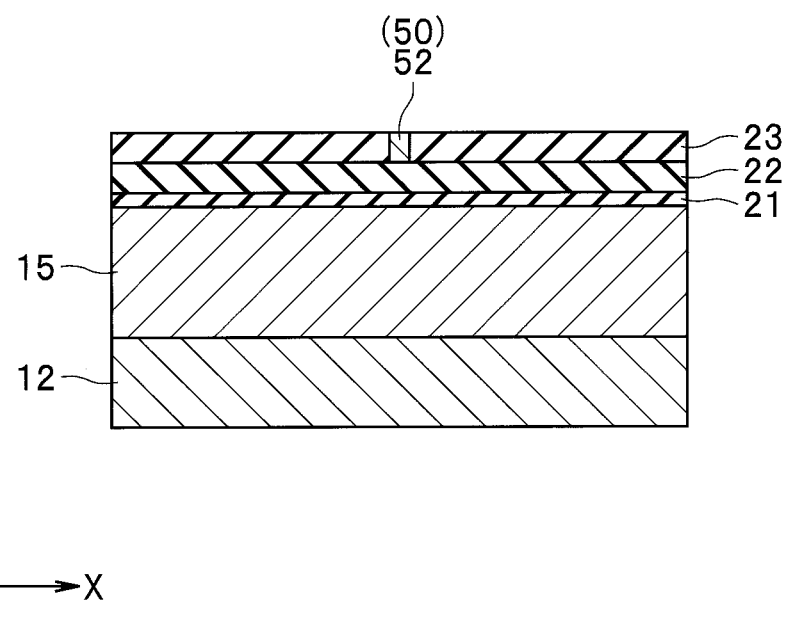

FIG. 15A and FIG. 15B show the next step. In this step, the dielectric layer 23 is initially polished by, for example, CMP, until the near-field transducer 52 is exposed. Next, an initial heat sink is formed on the near-field transducer 52 and the dielectric layer 23. Next, a not-shown photoresist mask is formed on the initial heat sink. The photoresist mask has the same planar shape as that of the heat sink 53 to be formed later. Next, the initial heat sink is etched by, for example, IBE, using the photoresist mask as the etching mask. This etching makes the initial heat sink into the heat sink 53. Next, the photoresist mask is removed.

Figure 16A:
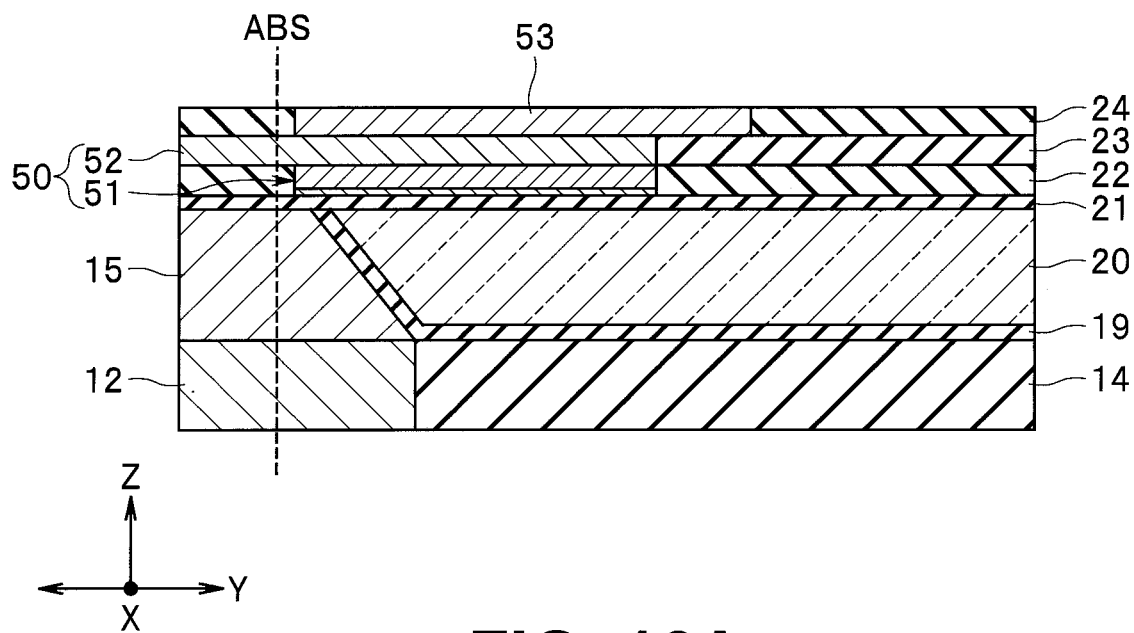
FIGS. 16A and 16B are cross-sectional views showing a step that follows the step shown in FIGS. 15A and 15B.
Figure 16B:
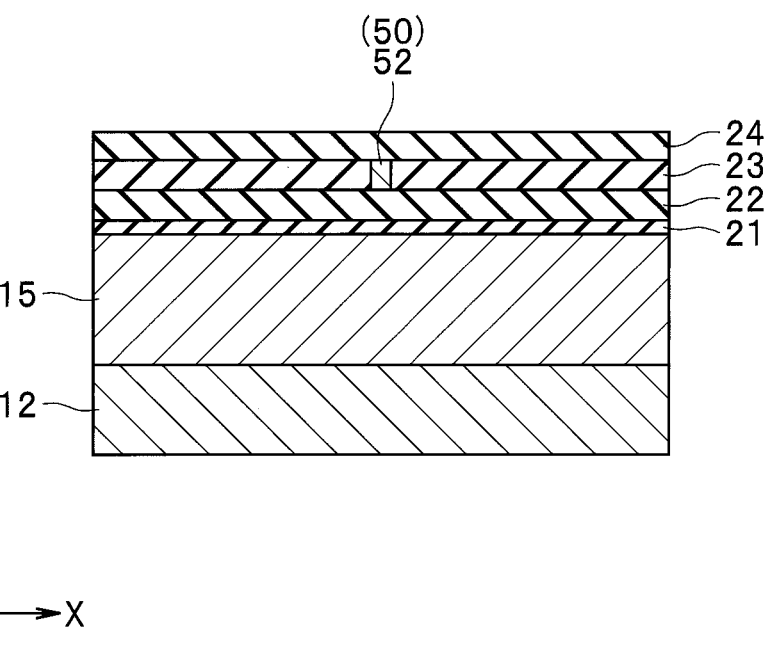

FIG. 16A and FIG. 16B show the next step. In this step, the cladding layers 21 and 22 and the dielectric layer 23 are selectively etched to form two openings in the cladding layers 21 and 22 and the dielectric layer 23. The two openings expose the top surfaces of the first layers of the respective coupling sections 16A and 16B. Next, the second layers of the coupling sections 16A and 16B are formed on the first layers of the respective coupling sections 16A and 16B. Next, the dielectric layer 24 is formed over the entire top surface of the stack. Next, the dielectric layer 24 and the second layers of the coupling sections 16A and 16B are polished by, for example, CMP until the heat sink 53 is exposed.

Figure 17A:
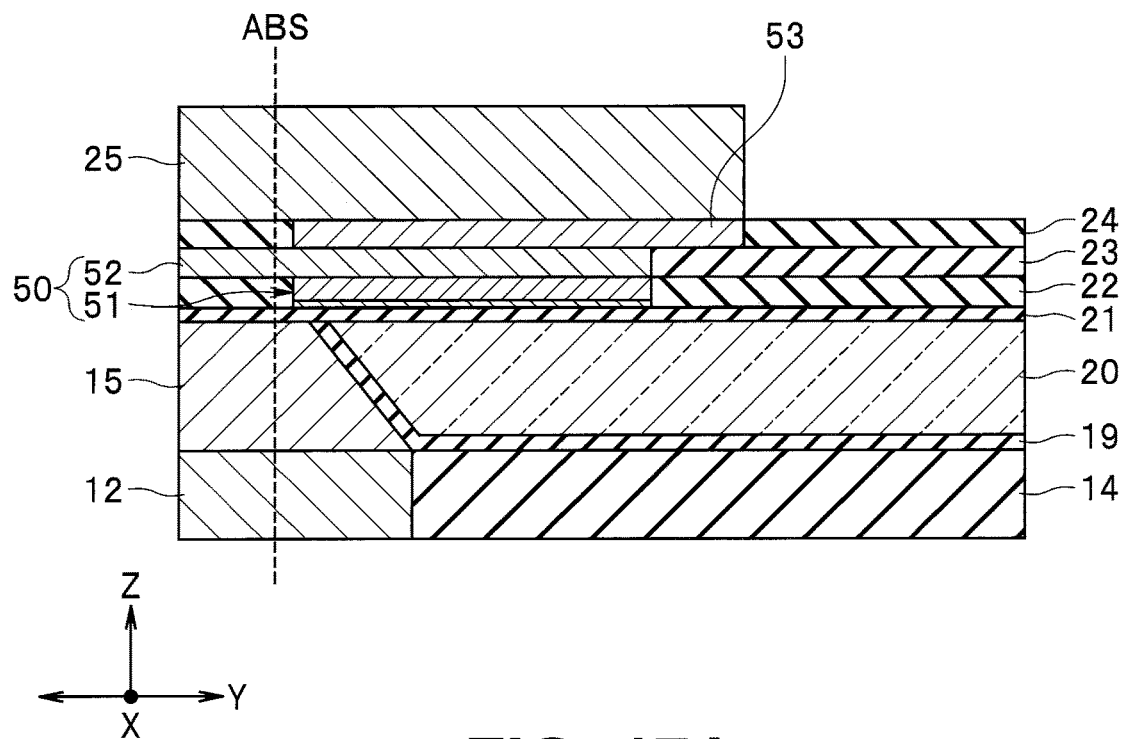
FIGS. 17A and 17B are cross-sectional views showing a step that follows the step shown in FIGS. 16A and 16B.
Figure 17B:
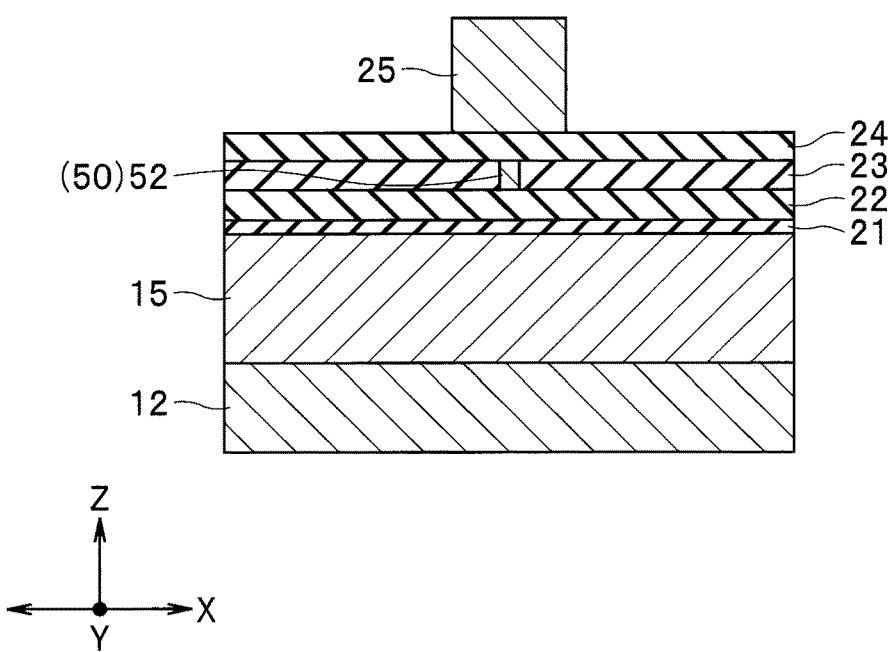

FIG. 17A and FIG. 17B show the next step. In this step, a not-shown photoresist layer is initially formed. The photoresist layer has a first opening having a shape corresponding to that of the main pole 25 and a second opening having a shape corresponding to that of the coupling layer 26. Next, the main pole 25 is formed in the first opening and the coupling layer 26 is formed in the second opening by plating, for example. Next, the photoresist layer is removed.

Steps to follow the step of FIGS. 17A and 17B will now be described with reference to FIG. 3. The dielectric layer 27 is initially formed over the entire top surface of the stack. Next, the dielectric layer 27 is polished by, for example, CMP, until the main pole 25 and the coupling layer 26 are exposed. Next, the coupling layer 28 is formed on the main pole 25, and the coupling layer 29 is formed on the coupling layer 26.

Next, the insulating film 33 is formed over the entire top surface of the stack. Then, the first layer 31 of the coil 30 is formed on the insulating film 33. The insulating layer 34 is then formed over the entire top surface of the stack. The insulating film 33 and the insulating layer 34 are then polished by, for example, CMP, until the coupling layers 28 and 29 and the first layer 31 are exposed. Next, the insulating layer 35 is formed over the entire top surface of the stack. The insulating layer 35 is then selectively etched to form therein an opening for exposing the top surface of the coupling layer 28 and an opening for exposing the top surface of the coupling layer 29.

Next, the coupling layer 36 is formed on the coupling layer 28, and the coupling layer 37 is formed on the coupling layer 29. Then, the insulating film 38 is formed over the entire top surface of the stack. The insulating layer 35 and the insulating film 38 are then selectively etched to form therein an opening for connecting the second layer 32 of the coil 30 to the first layer 31 of the coil 30. Next, the second layer 32 of the coil 30 is formed on the insulating film 38. Next, the insulating layer 39 is formed over the entire top surface of the stack. The insulating film 38 and the insulating layer 39 are then polished by, for example, CMP, until the coupling layers 36 and 37 and the second layer 32 are exposed.

Next, the insulating layer 40 is formed on the second layer 32 of the coil 30 and the insulating layer 39. The yoke layer 41 is then formed on the coupling layers 36 and 37 and the insulating layer 40. Next, the insulating layer 42 is formed over the entire top surface of the stack. The insulating layer 42 is then polished by, for example, CMP, until the yoke layer 41 is exposed. Then, the protective layer 43 is formed to cover the yoke layer 41 and the insulating layer 42. Wiring, terminals, and other components are then formed on the top surface of the protective layer 43. When the substructure is completed thus, the step of forming the medium facing surface 80 is performed. A protective film for covering the medium facing surface 80 may be formed there-after. Being provided with the medium facing surface 80, each pre-head portion becomes a thermally-assisted magnetic recording head 100.

The step of forming the medium facing surface 80 includes the step of polishing the surface of each pre-head portion that has resulted from cutting the substructure, and the step of forming a rail on the polished surface for allowing the slider to fly.

Second Embodiment

Figure 18:
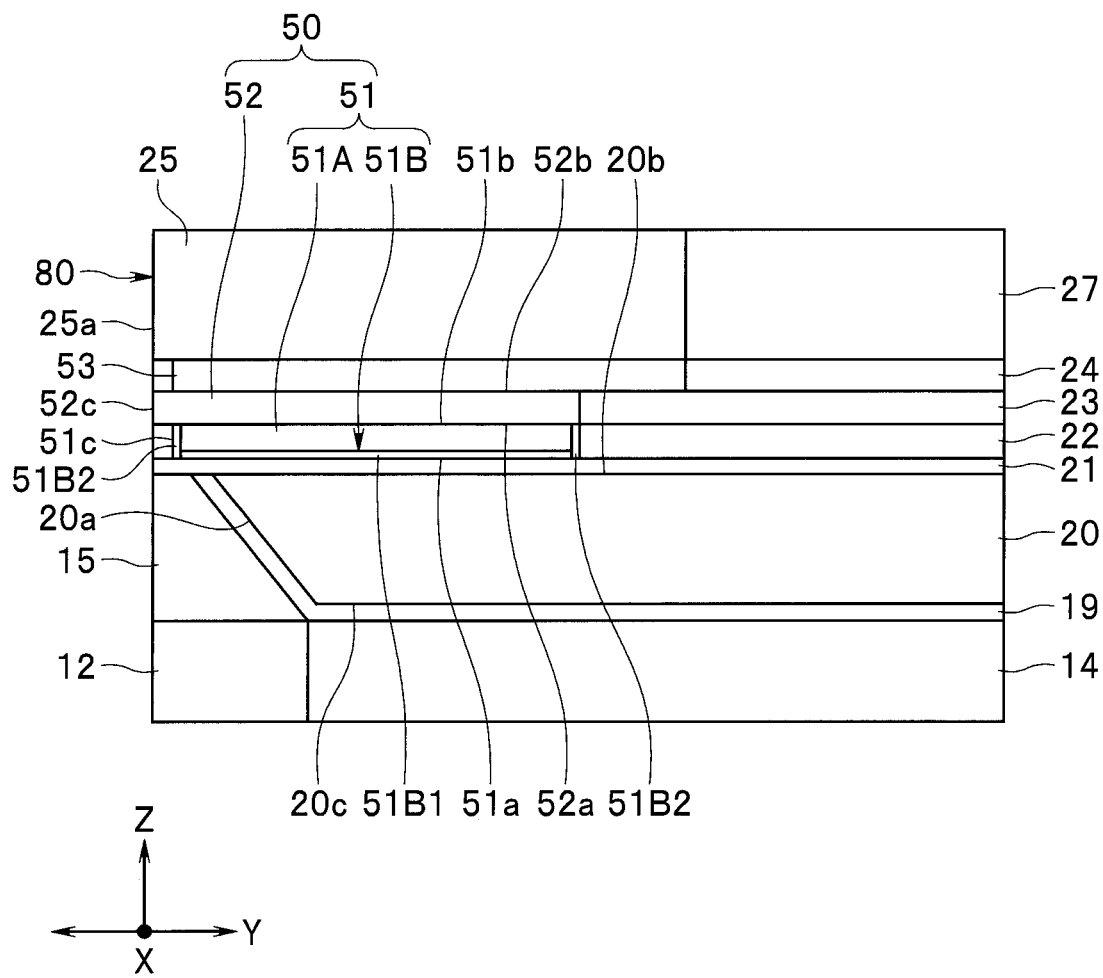
FIG. 18 is a cross-sectional view showing essential parts of a thermally-assisted magnetic recording head according to a second embodiment of the invention.

A second embodiment of the invention will now be described with reference to FIG. 18. FIG. 18 is a cross-sectional view showing essential parts of a thermally-assisted magnetic recording head according to the present embodiment.

The near-field light generator 50 according to the present embodiment is configured differently than in the first embodiment in the following ways. In the present embodiment, the second portion 51B of the plasmon generator 51 of the near-field light generator 50 includes a plate portion 51B1 and an outer rim portion 51B2. The plate portion 51B1 has the same shape and arrangement as those of the second portion 51B of the first embodiment. In the present embodiment, the plasmon exciting portion 51a of the plasmon generator 51 is almost entirely constituted by the bottom surface of the plate portion 51B1. The first portion 51A of the plasmon generator 51 is stacked on the plate portion 51B1 and covers the entire top surface of the plate portion 51B1.

The outer rim portion 51B2 has a ring-like shape and covers the periphery of the plate portion 51B1 and the first portion 51A. The outer rim portion 51B2 has an end that is closest to the medium facing surface 80 and located at a distance from the medium facing surface 80. The end 51c of the plasmon generator 51 is constituted by the foregoing end of the outer rim portion 51B2.

The outer rim portion 51B2 is in contact with the near-field transducer 52 of the near-field light generator 50. Since the outer rim portion 51B2 is part of the second portion 51B, the second portion 51B can be said to be in contact with the near-field transducer 52.

A manufacturing method for the thermally-assisted magnetic recording head 100 according to the present embodiment will now be described with reference to FIG. 19 to FIG. 23. The following descriptions include the description of a method of manufacturing the near-field light generator 50 according to the present embodiment. FIG. 19 to FIG. 23 each show a stack of layers formed in the process of manufacturing the thermally-assisted magnetic recording head 100. FIG. 19 to FIG. 23 each show a cross section that intersects the front end face 25a of the main pole 25 and that is perpendicular to the medium facing surface 80 and to the top surface 1a of the substrate 1 (see FIG. 3 and FIG. 4). In FIG. 19 to FIG. 23, the symbol ☐ABS☐indicates the location at which the medium facing surface 80 is to be formed. FIG. 19 to FIG. 23 omit the showing of portions located below the coupling layer 12 and the insulating layer 14.

Figure 19:
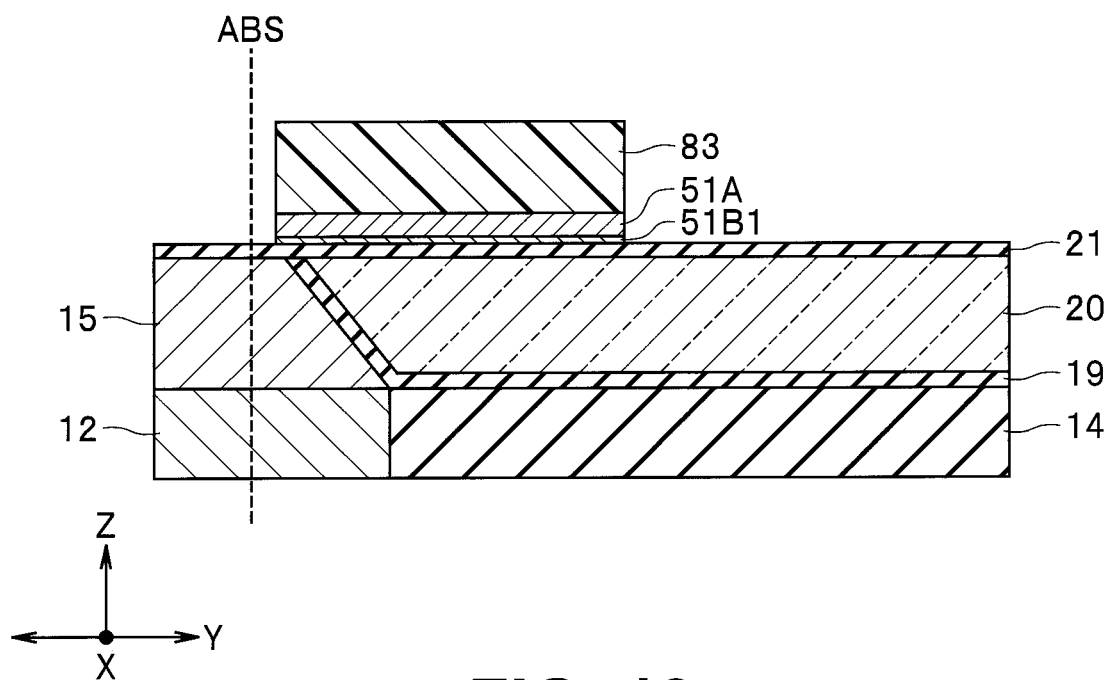
FIG. 19 is a cross-sectional view showing a step of a manufacturing method for the thermally-assisted magnetic recording head according to the second embodiment of the invention.

The manufacturing method for the thermally-assisted magnetic recording head 100 according to the present embodiment is the same as the method according to the first embodiment up to the step of forming the cladding layer 21 (see FIG. 6A and FIG. 6B). FIG. 19 shows the next step. In this step, a second metal film of the second metal material described in the first embodiment is initially formed on the dielectric layer 23 by sputtering, for example. Next, a first metal film of the first metal material described in the first embodiment is formed on the second metal film by sputtering, for example. Next, a photoresist mask 83 is formed on the first metal film. The forming method for the photoresist mask 83 is the same as that for the photoresist mask 81 of the first embodiment. The photoresist mask 83 has a planar shape corresponding to that of the plasmon generator 51 to be formed later.

Next, the first and second metal films are etched by, for example, IBE, using the photoresist mask 83 as the etching mask. This etching makes the first metal film into the first portion 51A, and the second metal film into the plate portion 51B1.

Figure 20:
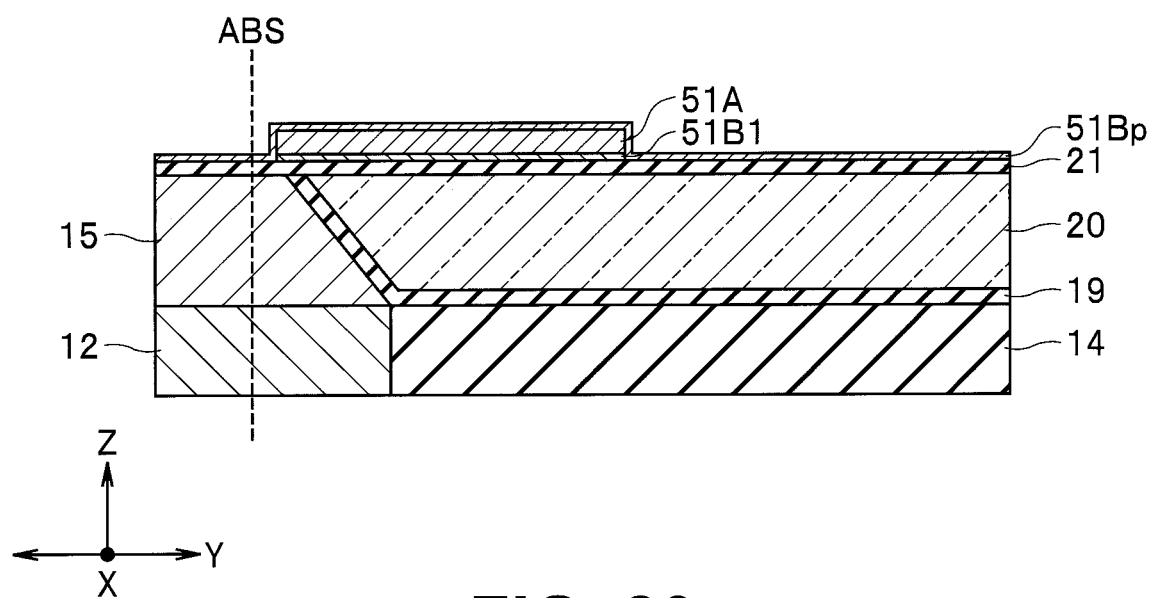
FIG. 20 is a cross-sectional view showing a step that follows the step shown in FIG. 19.

FIG. 20 shows the next step. In this step, the photoresist mask 83 is initially removed. Next, a metal film 51Bp of the second metal material is formed to cover the first portion 51A, the plate portion 51B1, and the cladding layer 21 by sputtering, for example.

Figure 21:
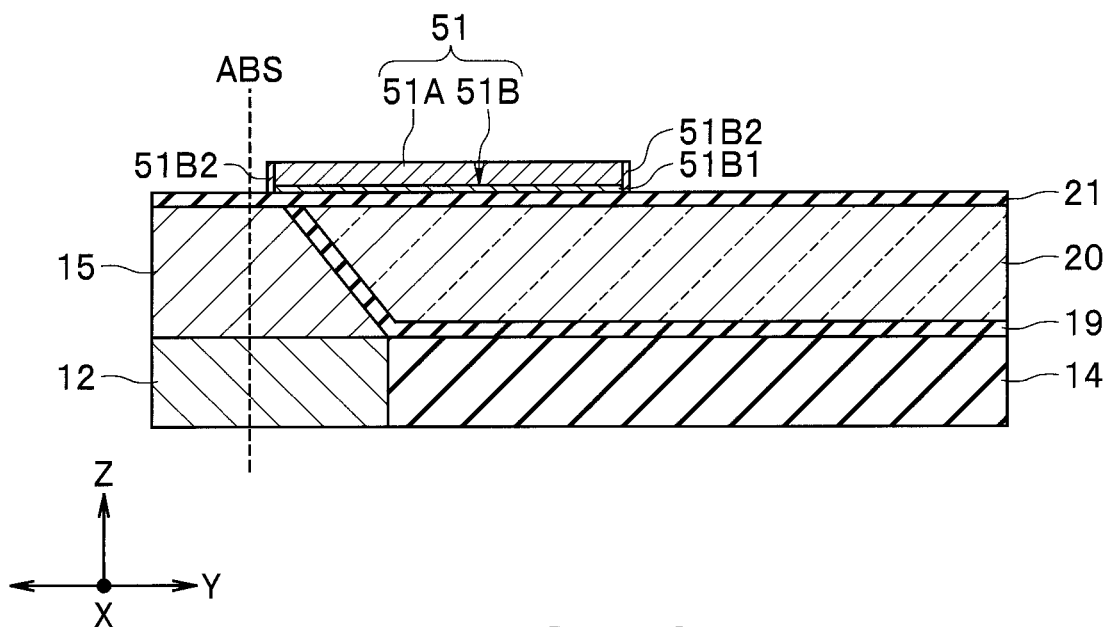
FIG. 21 is a cross-sectional view showing a step that follows the step shown in FIG. 20.

FIG. 21 shows the next step. In this step, the metal film 51Bp is etched by, for example, IBE, until the first portion 51A and the cladding layer 21 are exposed. The portion of the metal film 51Bp left unetched makes the outer rim portion 51B2. The plasmon generator 51 is thereby completed.

Figure 22:
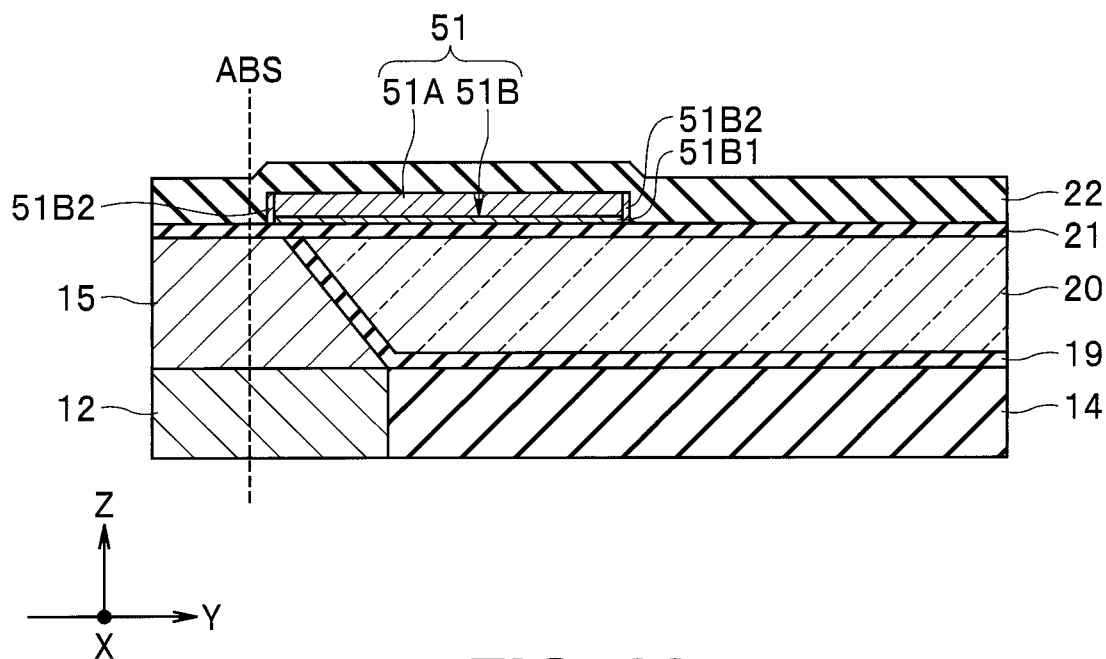
FIG. 22 is a cross-sectional view showing a step that follows the step shown in FIG. 21.

FIG. 22 shows the next step. In this step, the cladding layer 22 is formed over the entire top surface of the stack.

Figure 23:
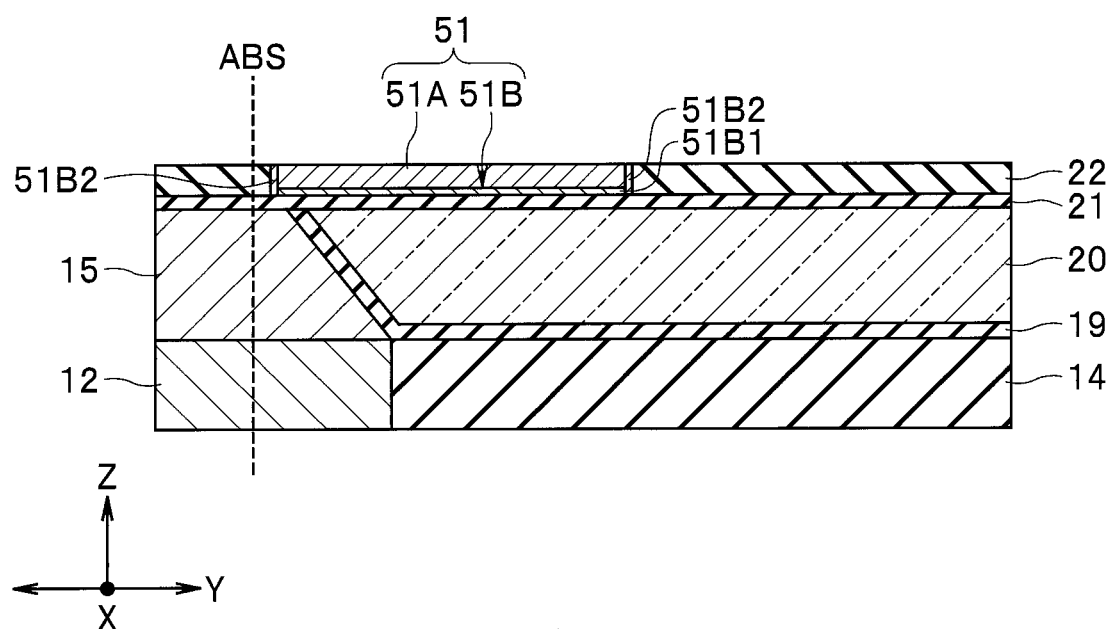
FIG. 23 is a cross-sectional view showing a step that follows the step shown in FIG. 22.

FIG. 23 shows the next step. In this step, the cladding layer 22 is polished by, for example, CMP, until the plasmon generator 51 is exposed. The subsequent steps are the same as those of the first embodiment.

The remainder of configuration, function and effects of the present embodiment are similar to those of the first embodiment.

Third Embodiment

Figure 24:
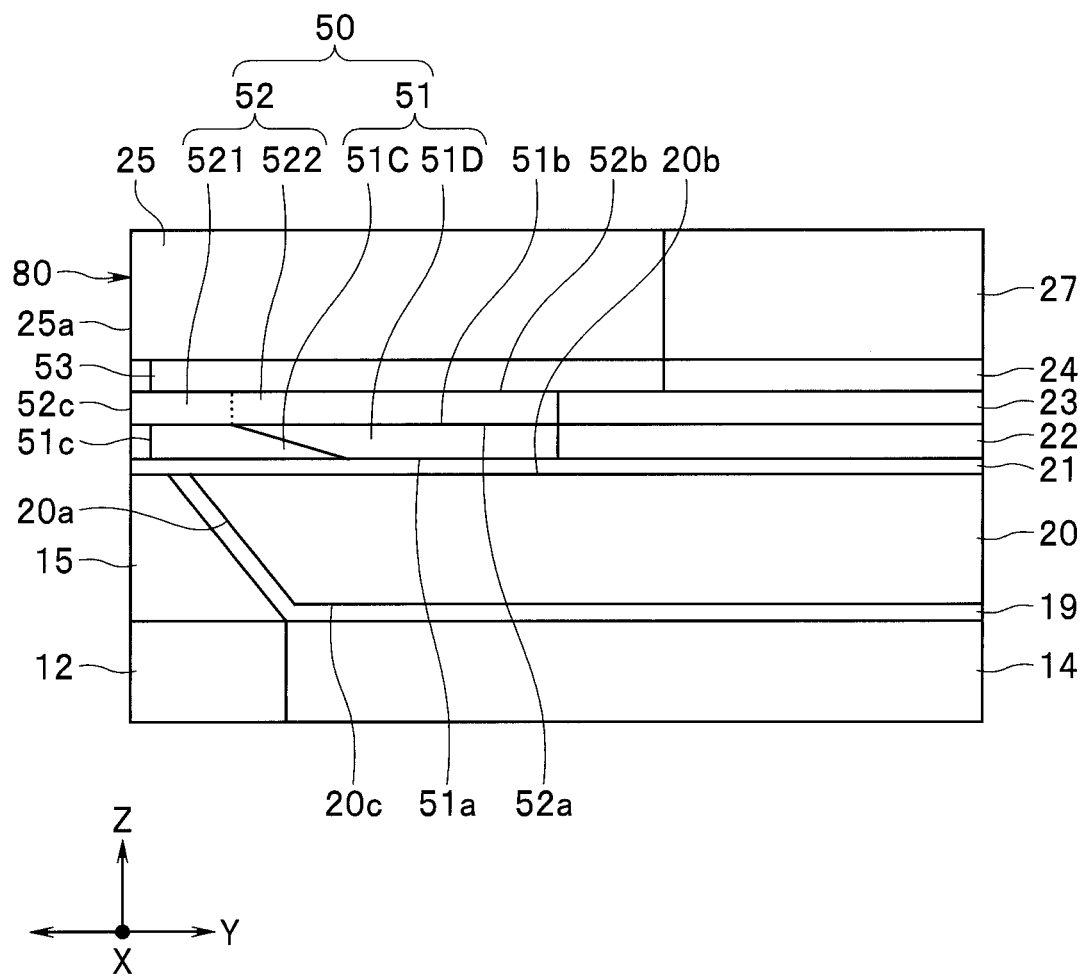
FIG. 24 is a cross-sectional view showing essential parts of a thermally-assisted magnetic recording head according to a third embodiment of the invention.

A third embodiment of the invention will now be described with reference to FIG. 24. FIG. 24 is a cross-sectional view showing essential parts of a thermally-assisted magnetic recording head according to the present embodiment.

The near-field light generator 50 according to the present embodiment is configured differently than in the first embodiment in the following ways. In the present embodiment, the near-field transducer 52 of the near-field light generator 50 includes a front portion 521 and a rear portion 522. The front portion 521 includes the front end face 52c of the near-field transducer 52. The rear portion 522 is located farther from the front end face 52c than the front portion 521 is. In FIG. 24, the border between the front portion 521 and the rear portion 522 is represented by a dotted line.

In the present embodiment, the plasmon generator 51 includes a first portion 51C and a second portion 51D instead of the first and second portions 51A and 52B of the first embodiment. The first portion 51C is formed of the first metal material described in the first embodiment. The second portion 51D is formed of the second metal material described in the first embodiment.

The first portion 51C includes a constant thickness portion including the end 51c of the plasmon generator 51, and a thickness changing portion located farther from the end 51c than the constant thickness portion is. The dimension of the constant thickness portion in the Z direction is constant regardless of the distance from the end 51c. The dimension of the thickness changing portion in the Z direction decreases with the increasing distance from the end 51c. The maximum dimension of the thickness changing portion in the Z direction is the same as that of the constant thickness portion in the Z direction.

Both the top and bottom surfaces of the constant thickness portion extend in a direction substantially perpendicular to the medium facing surface 80. The top surface of the thickness changing portion has a first end connected to the top surface of the constant thickness portion and a second end on the opposite side. In the present embodiment, the top surface of the thickness changing portion is inclined so that the second end is located behind the first end in the traveling direction of the recording medium 90 (Z direction). The bottom surface of the thickness changing portion extends in a direction substantially perpendicular to the medium facing surface 80.

The second portion 51D is located on the thickness changing portion of the first portion 51C and the cladding layer 21 so that the second portion 51D extends over the top surface of the thickness changing portion.

Both the first portion 51C and the second portion 51D are in contact with the near-field transducer 52. The first portion 51C is in contact with the front portion 521 of the near-field transducer 52. The second portion 51D is in contact with the rear portion 522 of the near-field transducer 52. The first portion 51C includes a part of the plasmon exciting portion 51a of the plasmon generator 51. The second portion 51D includes another part of the plasmon exciting portion 51a of the plasmon generator 51.

As described in the first embodiment, part of the energy of the near-field light generated at the front end face 52c of the near-field transducer 52 is converted into heat. In the present embodiment, as described above, the second portion 51D is in contact with the rear portion 522 of the near-field transducer 52 and located farther from the front end face 52c of the near-field transducer 52 than the first portion 51C is. According to the present embodiment, deformation of the second portion 51B due to the heat generation at the front end face 52c of the near-field transducer 52 can thereby be suppressed.

A manufacturing method for the thermally-assisted magnetic recording head 100 according to the present embodiment will now be described with reference to FIG. 25 to FIG. 29. The following descriptions include the description of a method of manufacturing the near-field light generator 50 according to the present embodiment. FIG. 25 to FIG. 29 each show a stack of layers formed in the process of manufacturing the thermally-assisted magnetic recording head 100. FIG. 25 to FIG. 29 each show a cross section that intersects the front end face 25a of the main pole 25 and that is perpendicular to the medium facing surface 80 and to the top surface 1a of the substrate 1 (see FIG. 3 and FIG. 4). In FIG. 25 to FIG. 29, the symbol □ABS□indicates the location at which the medium facing surface 80 is to be formed. FIG. 25 to FIG. 29 omit the showing of portions located below the coupling layer 12 and the insulating layer 14.

Figure 25:
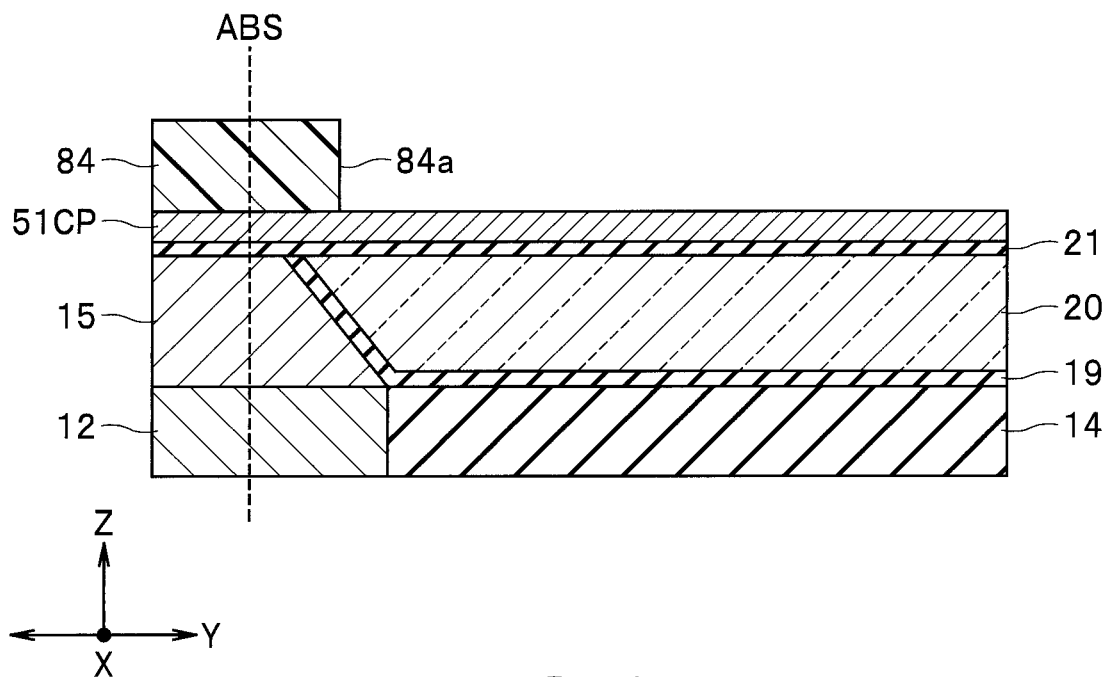
FIG. 25 is a cross-sectional view showing a step of a manufacturing method for the thermally-assisted magnetic recording head according to the third embodiment of the invention.

The manufacturing method for the thermally-assisted magnetic recording head 100 according to the present embodiment is the same as the method according to the first embodiment up to the step of forming the cladding layer 21 (see FIG. 6A and FIG. 6B). FIG. 25 shows the next step. In this step, a first metal film 51CP of the first metal material is initially formed on the cladding layer 21 by sputtering, for example. Next, a photoresist mask 84 is formed on the first metal film 51CP. The forming method for the photoresist mask 84 is the same as that for the photoresist mask 81 of the first embodiment. The photoresist mask 84 has a wall surface 84a that defines the position of the first end of the top surface of the thickness changing portion of the first portion 51C to be formed later.

Figure 26:
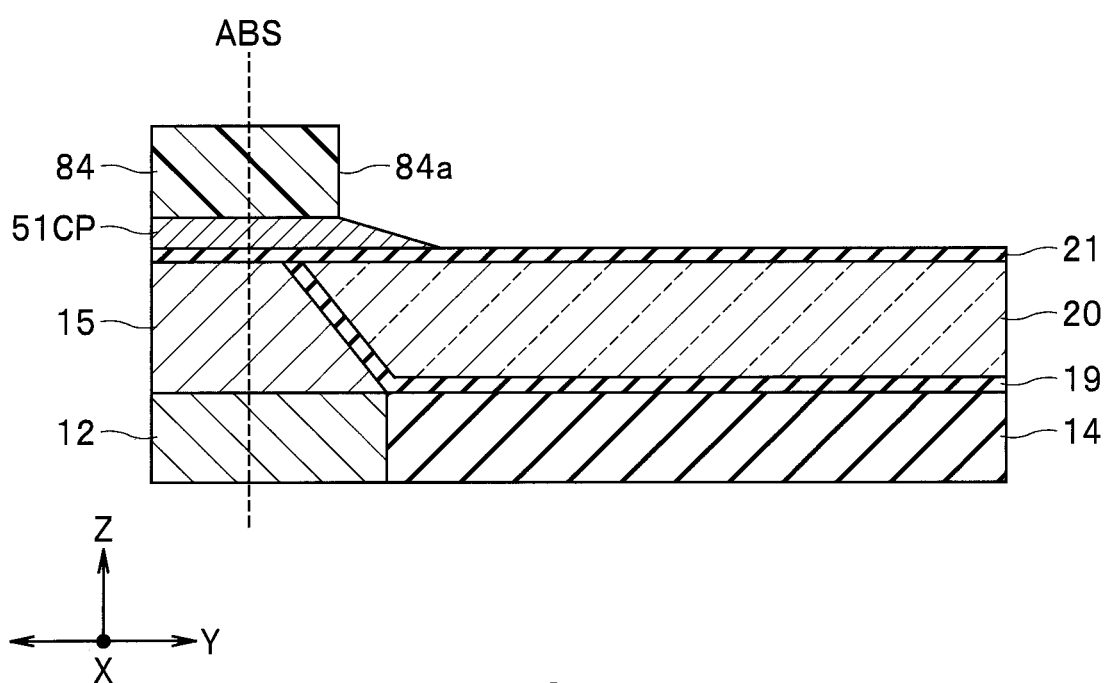
FIG. 26 is a cross-sectional view showing a step that follows the step shown in FIG. 25.

FIG. 26 shows the next step. In this step, the first metal film 51CP is etched by, for example, IBE, using the photoresist mask 84 so that the top surface of the thickness changing portion of the first portion 51C is formed on the first metal film 51CP.

Figure 27:
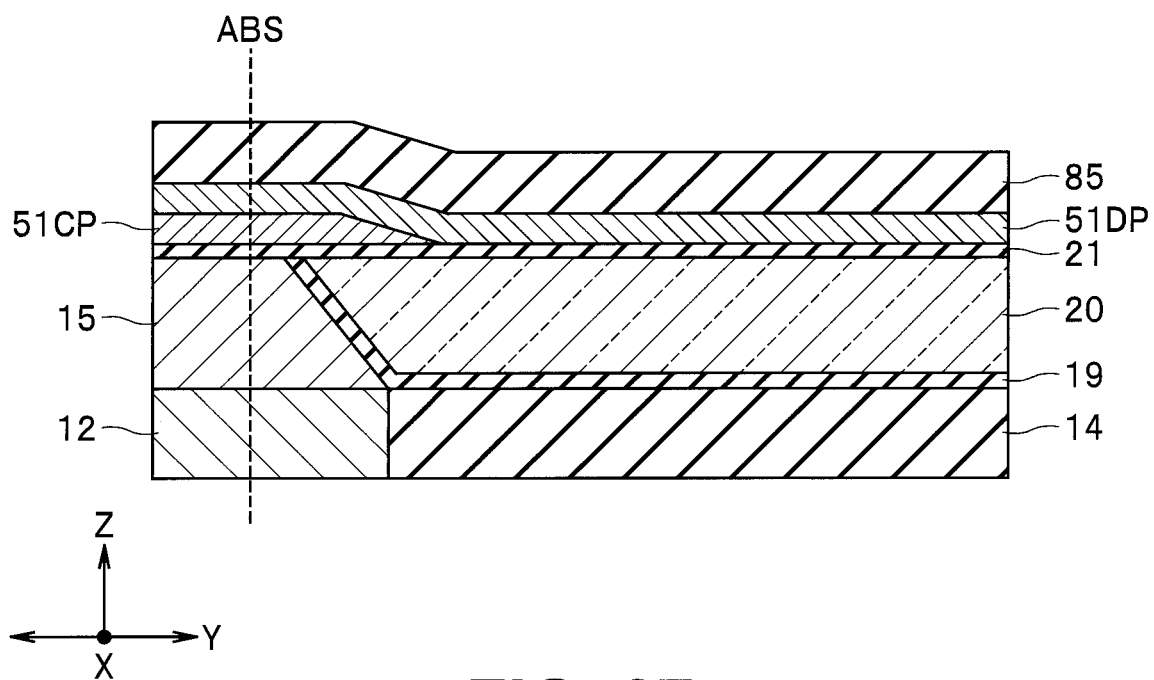
FIG. 27 is a cross-sectional view showing a step that follows the step shown in FIG. 26.

FIG. 27 shows the next step. In this step, the photoresist mask 84 is initially removed. Next, a second metal film 51DP of the second metal material is formed on the first metal film 51CP and the cladding layer 21 by sputtering, for example. Next, a dielectric layer 85 of, e.g., silicon oxide is formed over the entire top surface of the stack.

Figure 28:
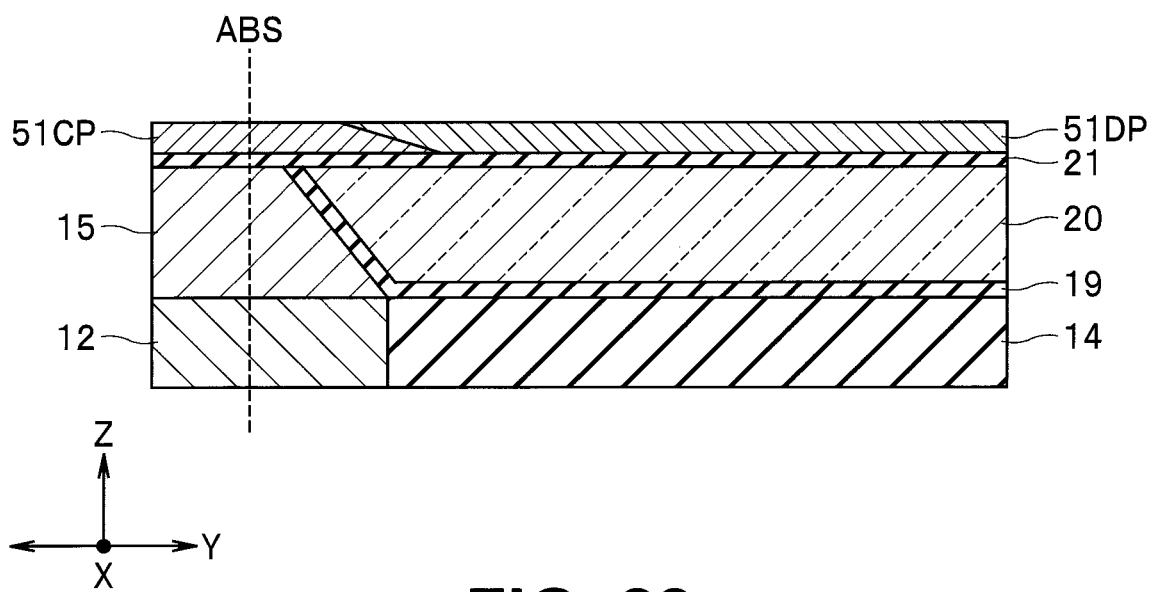
FIG. 28 is a cross-sectional view showing a step that follows the step shown in FIG. 27.

FIG. 28 shows the next step. In this step, the second metal film 51DP and the dielectric layer 85 are polished by, for example, CMP, until the first metal film 51CP is exposed.

Figure 29:
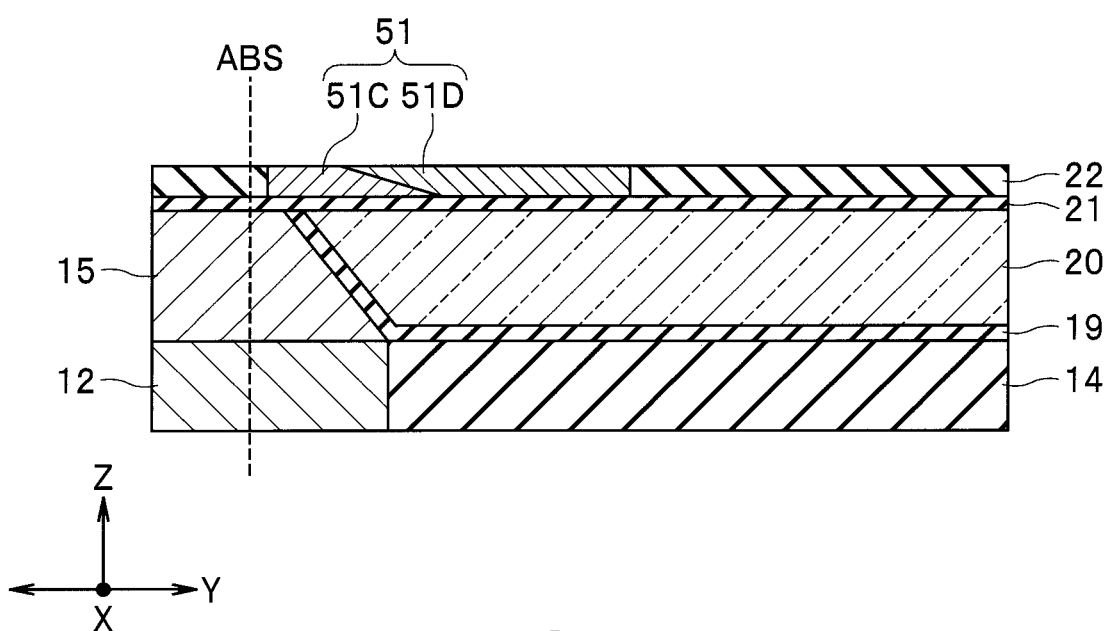
FIG. 29 is a cross-sectional view showing a step that follows the step shown in FIG. 28.

FIG. 29 shows the next step. In this step, a not-shown photoresist mask is initially formed on the first and second metal films 51CP and 51DP. The not-shown photoresist mask has the same shape as that of the photoresist mask 81 of the first embodiment. Next, the first and second metal films 51CP and 51DP and the dielectric layer 85 are etched by, for example, IBE, using the not-shown photoresist mask as the etching mask. This etching makes the first metal film 51CP into the first portion 51C, and the second metal film 51DP into the second portion 51D. The plasmon generator 51 is thereby completed.

Next, the not-shown photoresist mask is removed. Next, the cladding layer 22 is formed over the entire top surface of the stack. Next, the cladding layer 22 is polished by, for example, CMP, until the plasmon generator 51 is exposed. The subsequent steps are the same as those of the first embodiment.

The remainder of configuration, function and effects of the present embodiment are similar to those of the first embodiment.

Experimental Results

Next, the results of an experiment examining the thermal stability of PtAu alloys will be described. In the experiment, a plurality of samples of PtAu alloys with different Pt contents within the range of 0 wt % to 100 wt % was used. The sample with a Pt content of 0 wt % was a sample entirely formed of Au. The sample with a Pt content of 100 wt % was a sample entirely formed of Pt.

In the experiment, the plurality of samples was annealed at a plurality of temperatures of or below 500° C. The plurality of samples before annealing and the plurality of samples annealed were examined for surface roughness, optical characteristics, and resistivity p at each temperature. In the experiment, the arithmetic average roughness Ra was used as a parameter indicating the surface roughness. A quality factor $Q_{LSP}$ indicating the quality of local surface plasmons was used as a parameter indicating the optical characteristics. In the experiment, the arithmetic average roughness Ra, the quality factor $Q_{LSP}$, and the resistivity p were each normalized to have a value of 1 at 20° C.

Figure 30:
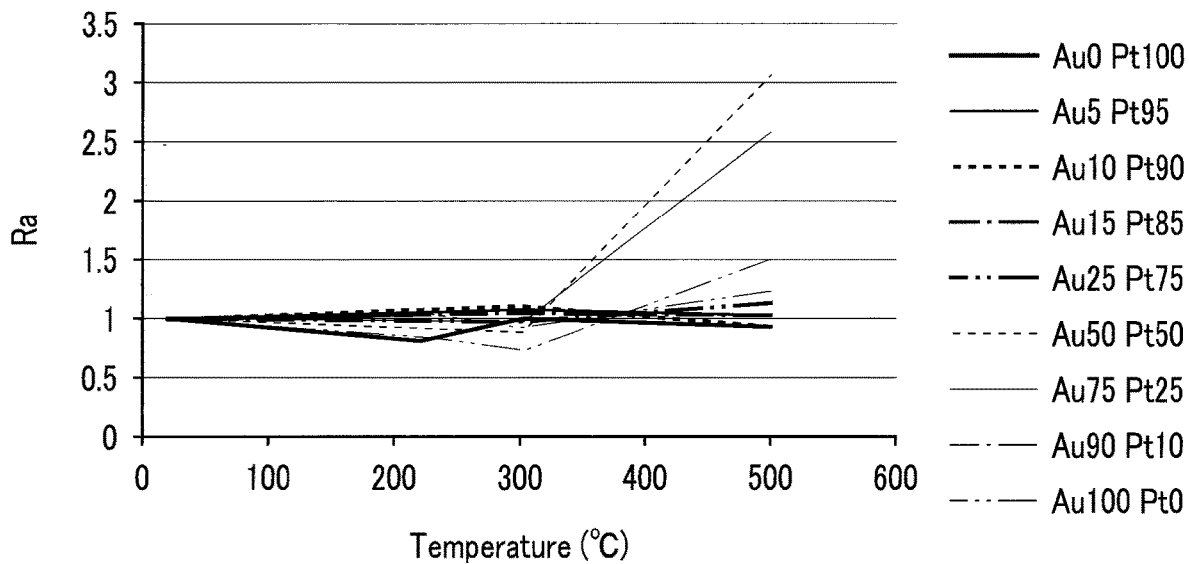
FIG. 30 is a characteristic chart showing temperature dependence of surface roughness of a plurality of samples used in an experiment.
Figure 31:
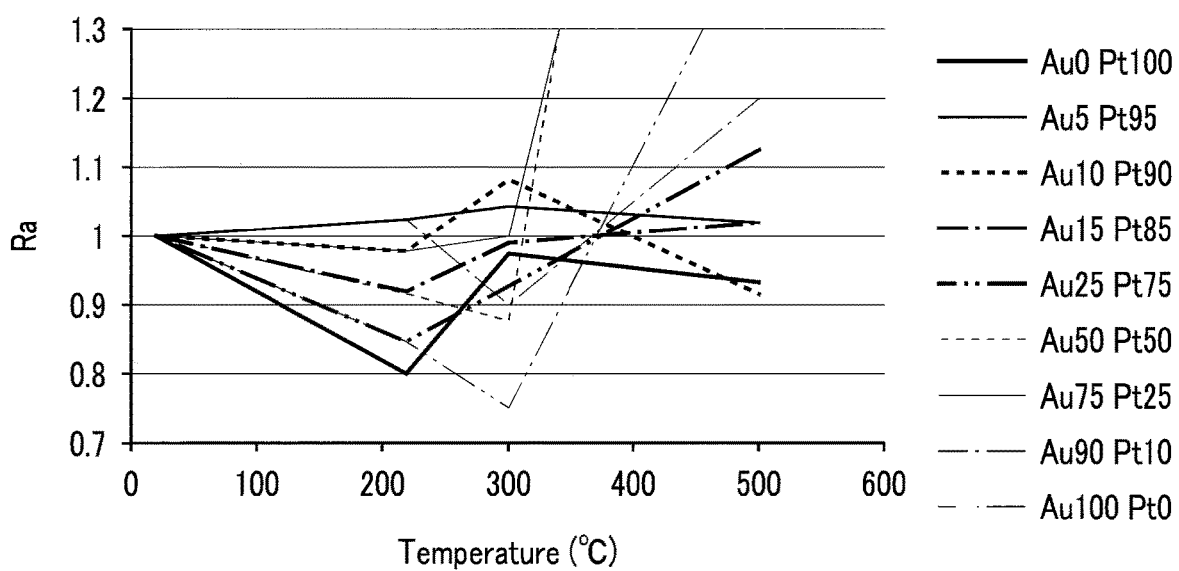
FIG. 31 is a characteristic chart showing a portion of FIG. 30 on an enlarged scale.

FIG. 30 is a characteristic chart showing temperature dependence of the surface roughness of the plurality of samples used in the experiment. FIG. 31 is a characteristic chart showing a portion of FIG. 30 on an enlarged scale. In FIGS. 30 and 31, the horizontal axis represents the temperature, and the vertical axis the arithmetic average roughness Ra. From FIGS. 30 and 31, it can be seen that the samples with a Pt content of 75 wt % or more and 100 wt % or less did not vary much in the arithmetic average roughness Ra with temperature changes.

The arithmetic average roughness Ra depends on grain size. If the amount of variation in the arithmetic average roughness Ra under temperature changes is small, crystal grains do not move nor does the grain size change even at high temperatures. The thermal stability can thus be said to be satisfactory. From FIGS. 30 and 31, the samples with a Pt content of 75 wt % or more and 100 wt % or less can be said to have satisfactory thermal stability.

Figure 32:
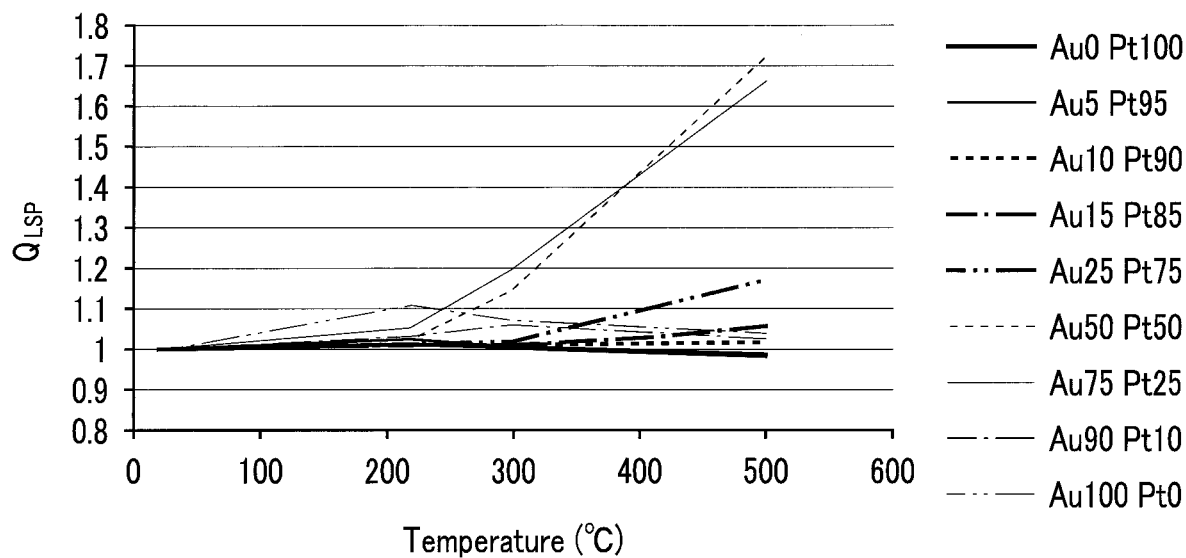
FIG. 32 is a characteristic chart showing temperature dependence of optical characteristics of the plurality of samples used in the experiment.
Figure 33:
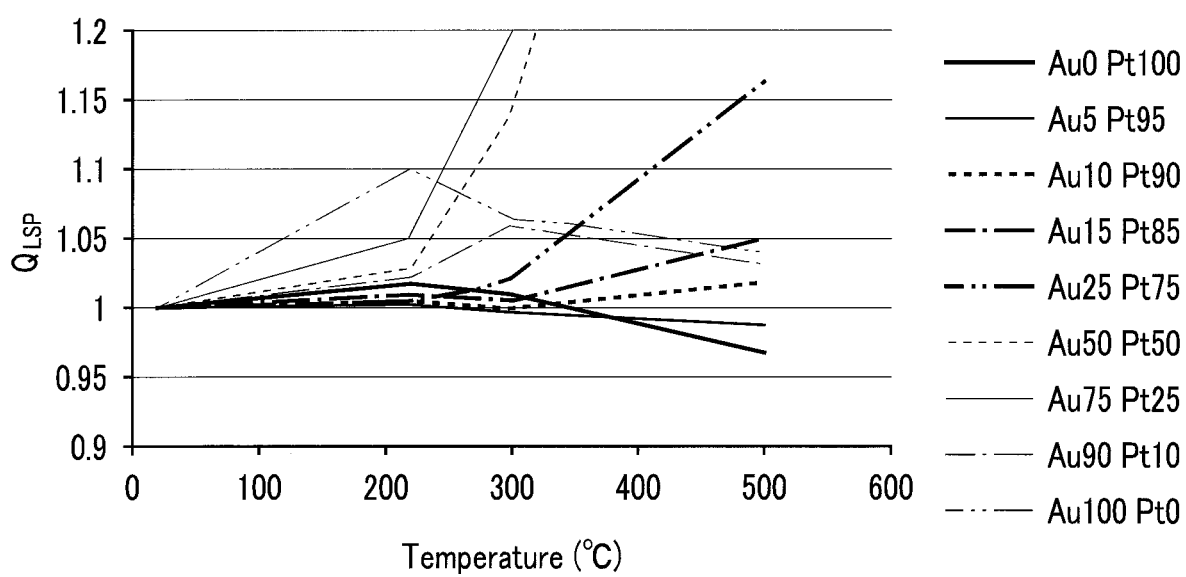
FIG. 33 is a characteristic chart showing a portion of FIG. 32 on an enlarged scale.

FIG. 32 is a characteristic chart showing temperature dependence of the optical characteristics of the plurality of samples used in the experiment. FIG. 33 is a characteristic chart showing a portion of FIG. 32 on an enlarged scale. In FIGS. 32 and 33, the horizontal axis represents the temperature, and the vertical axis the quality factor $Q_{LSP}$. From FIGS. 32 and 33, the samples with a Pt content of 75 wt % or more and 100 wt % or less can be said to not vary much in the quality factor $Q_{LSP}$ under temperature changes and to have optically satisfactory thermal stability.

Figure 34:
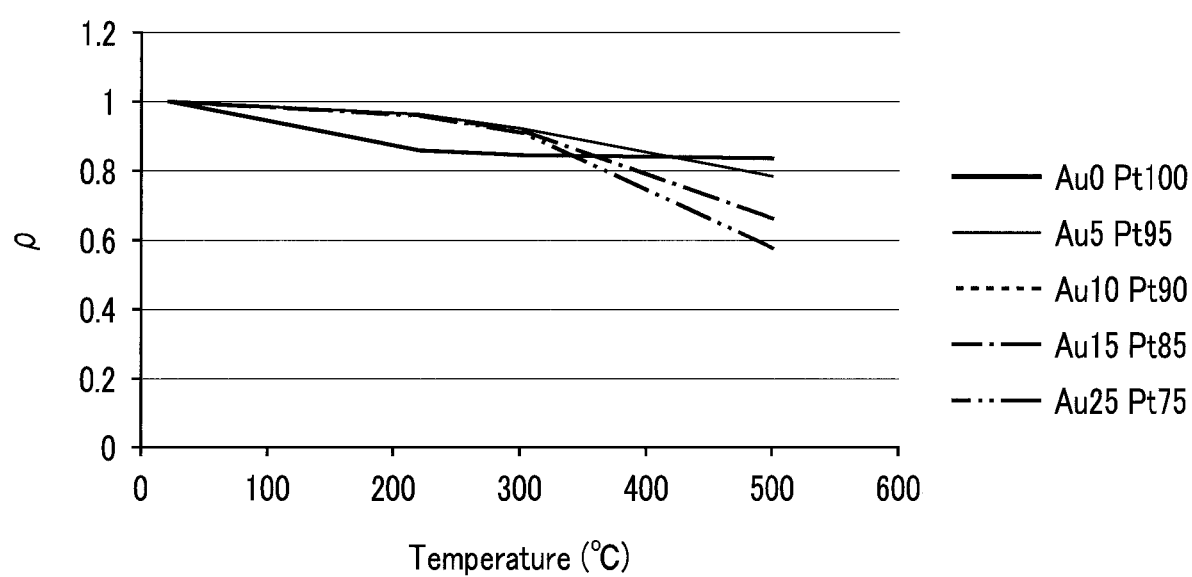
FIG. 34 is a characteristic chart showing temperature dependence of resistivity of the plurality of samples used in the experiment.

FIG. 34 is a characteristic chart showing temperature dependence of the resistivities of the plurality of samples used in the experiment. In FIG. 34, the horizontal axis represents the temperature, and the vertical axis the resistivity p. From FIG. 34, it can be seen that the resistivity p of the sample with a Pt content of 100 wt % at 220° C. was lower than those of the samples with a Pt content of other than 100 wt %. It is also shown that the resistivities p of the samples with a Pt content of other than 100 wt % at 220° C. were hardly different from those at 20° C. The annealing treatment at 220° C. is predicated on hard baking for curing a photoresist and annealing to be performed for predetermined purposes in the manufacturing process of the thermally-assisted magnetic recording head 100.

The resistivity p depends on grain size and metal structure. From FIG. 34, the annealing treatment at 220° C. can be said to hardly change the grain size or metal structure of the samples with a Pt content of other than 100 wt %.

From the foregoing, PtAu alloys with a Pt content of 75 wt % or more and not more than 99 wt % can be said to have structurally and optically favorable thermal stability.

As described above, the first metal material is used as the material of the first portion 51A of the plasmon generator 51 and the material of the near-field transducer 52. If a PtAu alloy is used as the first metal material, the Pt content of the PtAu alloy is preferably 75 wt % or more and not more than 99 wt % for the sake of improved thermal stability.

The present invention is not limited to the foregoing embodiments, and various modifications may be made thereto. For example, the shape and configuration of the plasmon generator 51 and the near-field transducer 52 are not limited to the examples described in the embodiments and may be freely set as long as the requirements set forth in the claims are satisfied.

Obviously, many modifications and variations of the present invention are possible in the light of the above teachings. Thus, it is to be understood that, within the scope of the appended claims and equivalents thereof, the invention may be practiced in other embodiments than the foregoing most preferable embodiments.

What is claimed is:
1. A near-field light generator comprising:
a plasmon generator including a plasmon exciting portion on which a surface plasmon is excited; and
a near-field transducer including a front end face that generates near-field light from the surface plasmon, wherein
the near-field transducer is formed of a first metal material,
the plasmon generator includes a first portion formed of the first metal material and a second portion formed of a second metal material,
the first portion is in contact with the near-field transducer, and the second portion includes at least part of the plasmon exciting portion.

2. The near-field light generator according to claim 1, wherein the second portion is not in contact with the near-field transducer.

3. The near-field light generator according to claim 1, wherein the second portion is in contact with the near-field transducer.

4. The near-field light generator according to claim 3, wherein:
the near-field transducer includes a front portion and a rear portion located farther from the front end face than the front portion is;
the first portion of the plasmon generator is in contact with the front portion of the near-field transducer; and
the second portion of the plasmon generator is in contact with the rear portion of the near-field transducer.

5. The near-field light generator according to claim 1, wherein the plasmon generator is a planar plasmon generator.

6. The near-field light generator according to claim 1, wherein:
the first metal material is a PtAu alloy; and
the second metal material is Au.

7. The near-field light generator according to claim 6, wherein the PtAu alloy has a Pt content of 75 wt % or more and not more than 99 wt %.

8. A thermally-assisted magnetic recording head comprising:
a medium facing surface that faces a recording medium;
a main pole that generates a recording magnetic field for recording information on the recording medium;
a waveguide including a core that propagates light and a cladding that is located around the core; and
the near-field light generator according to claim 1, wherein
the front end face of the near-field transducer is located in the medium facing surface.

9. The thermally-assisted magnetic recording head according to claim 8, wherein:
the core includes an evanescent light generating surface that generates evanescent light from the light propagating through the core; and
the surface plasmon is excited on the plasmon exciting portion of the plasmon generator through coupling with the evanescent light.

10. The thermally-assisted magnetic recording head according to claim 8, wherein the plasmon generator includes an end that is closest to the medium facing surface and located at a distance from the medium facing surface.

11. The thermally-assisted magnetic recording head according to claim 8, wherein the second portion is not in contact with the near-field transducer.

12. The thermally-assisted magnetic recording head according to claim 8, wherein the second portion is in contact with the near-field transducer.

13. The thermally-assisted magnetic recording head according to claim 12, wherein:

the near-field transducer includes a front portion and a rear portion located farther from the front end face than the front portion is;
the first portion of the plasmon generator is in contact with the front portion of the near-field transducer; and
the second portion of the plasmon generator is in contact with the rear portion of the near-field transducer.

14. The thermally-assisted magnetic recording head according to claim 8, wherein the plasmon generator is a planar plasmon generator.

15. The thermally-assisted magnetic recording head according to claim 8, wherein:
the first metal material is a PtAu alloy; and
the second metal material is Au.

16. The thermally-assisted magnetic recording head according to claim 15, wherein the PtAu alloy has a Pt content of 75 wt % or more and not more than 99 wt %.

* * * * *